US009652229B2

(12) United States Patent
Mitsuishi et al.

(10) Patent No.: US 9,652,229 B2
(45) Date of Patent: May 16, 2017

(54) SEMICONDUCTOR DEVICE

(71) Applicant: Renesas Electronics Corporation, Kawasaki-shi, Kanagawa (JP)

(72) Inventors: Naoki Mitsuishi, Kanagawa (JP); Seiji Ikari, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 147 days.

(21) Appl. No.: 14/574,710

(22) Filed: Dec. 18, 2014

(65) Prior Publication Data
US 2015/0178003 A1    Jun. 25, 2015

(30) Foreign Application Priority Data

Dec. 25, 2013  (JP) ................................. 2013-266791

(51) Int. Cl.
*G06F 3/00* (2006.01)
*G06F 9/30* (2006.01)
*G06F 13/00* (2006.01)
*G06F 17/10* (2006.01)
*G06F 17/15* (2006.01)

(52) U.S. Cl.
CPC .............. *G06F 9/30* (2013.01); *G06F 13/00* (2013.01); *G06F 17/10* (2013.01); *G06F 17/15* (2013.01)

(58) Field of Classification Search
None
See application file for complete search history.

(56) References Cited

U.S. PATENT DOCUMENTS

| 5,809,259 A * | 9/1998 | Mitsuishi | G06F 9/30043 710/100 |
| 2005/0251658 A1* | 11/2005 | Sugai | G06F 7/5443 712/221 |
| 2006/0075165 A1* | 4/2006 | Hui | H04L 47/10 710/58 |
| 2009/0165020 A1* | 6/2009 | Allen | G06F 13/4243 719/314 |
| 2011/0167189 A1* | 7/2011 | Matsubara | G06F 3/0611 710/308 |
| 2011/0213921 A1* | 9/2011 | Yu | G06F 3/061 711/103 |
| 2013/0232284 A1* | 9/2013 | Akiyama | G06F 3/061 710/23 |
| 2014/0281588 A1* | 9/2014 | Vogan | G06F 21/79 713/193 |

FOREIGN PATENT DOCUMENTS

| JP | 1-125644 A | 5/1989 |
| JP | 5-307516 A | 11/1993 |
| JP | 7-129537 A | 5/1995 |
| JP | 2000-194647 A | 7/2000 |

* cited by examiner

Primary Examiner — Elias Mamo
(74) Attorney, Agent, or Firm — Shapiro, Gabor & Rosenberger, PLLC

(57) ABSTRACT

A semiconductor device is provided, which can supply efficiently plural pieces of data required for operation to an arithmetic unit processing plural pieces of data concurrently. The microcomputer includes a data transfer controller and a filter arithmetic unit. The data transfer controller transfers plural pieces of data from a source address area to a destination address area continuously, based on data transfer information, when a start request is received. The filter arithmetic unit performs operation using concurrently plural pieces of data received from the data transfer controller.

14 Claims, 26 Drawing Sheets

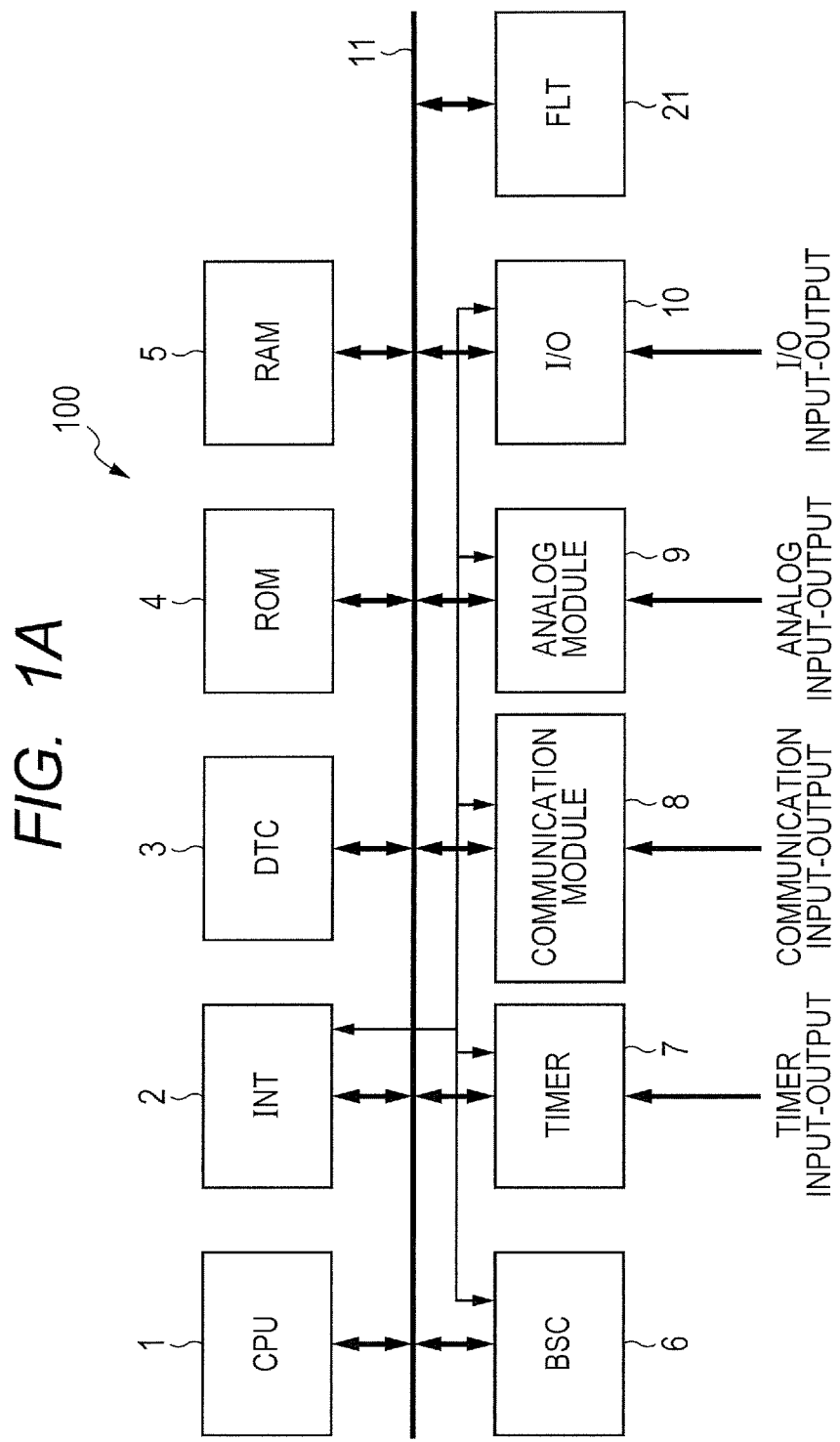

FIG. 2

| BIT | MR | SAR | DAR | CR |
|---|---|---|---|---|
| 0 | NXTE0 | | | TCRL |
| | NXTE1 | | | |
| | - | | | |
| | - | | | |
| | - | | | |
| | - | | | |
| | SZ0 | | | |
| | SZ1 | | | TCRH |
| | TMD0 | | | |
| | TMD1 | | | |
| | TMD2 | | | |
| | DIR | | | |
| | DM0 | | | |
| | DM1 | | | |
| | SM0 | | | |
| 15 | SM1 | | | |
| 16 | - | | | BTCRL |
| | - | | | |
| | - | | | |
| | - | | | |
| | - | | | |
| | - | | | |
| | - | | | |
| | - | | | |
| | - | | | BTCRH |
| | - | | | |
| | - | | | |
| | - | | | |
| | - | | | |
| | - | | | |
| | - | | | |
| 31 | - | | | |

Right-side grouping: TCRL + TCRH = TCR; BTCRL + BTCRH = BTCR

FIG. 4

| TRANSFER MODE | NUMBER OF DATA AT STARTUP | SPECIFICATION OF EXECUTION COUNT | DIR | SOURCE ADDRESS | DESTINATION ADDRESS |
|---|---|---|---|---|---|
| NORMAL MODE | 1 | TCR | — | NORMAL (CONTINUOUS) ADDRESS | NORMAL (CONTINUOUS) ADDRESS |
| REPEAT MODE | 1 | — | 0 | REPEAT (REPEATING) AREA | NORMAL (CONTINUOUS) ADDRESS |
| | | | 1 | NORMAL (CONTINUOUS) ADDRESS | REPEAT (REPEATING) AREA |
| BLOCK TRANSFER MODE | SPECIFIED BY TCR | BTCR | 0 | BLOCK (REPEATING) AREA | NORMAL (CONTINUOUS) ADDRESS |
| | | | 1 | NORMAL (CONTINUOUS) ADDRESS | BLOCK (REPEATING) AREA |
| DUAL BLOCK MODE | | — | — | BLOCK (REPEATING) AREA | BLOCK (REPEATING) AREA |
| SHIFT BLOCK MODE | | — | 0 | BLOCK (REPEATING) AREA WITH ROTATION | BLOCK (REPEATING) AREA |
| | | | 1 | BLOCK (REPEATING) AREA | BLOCK (REPEATING) AREA WITH ROTATION |

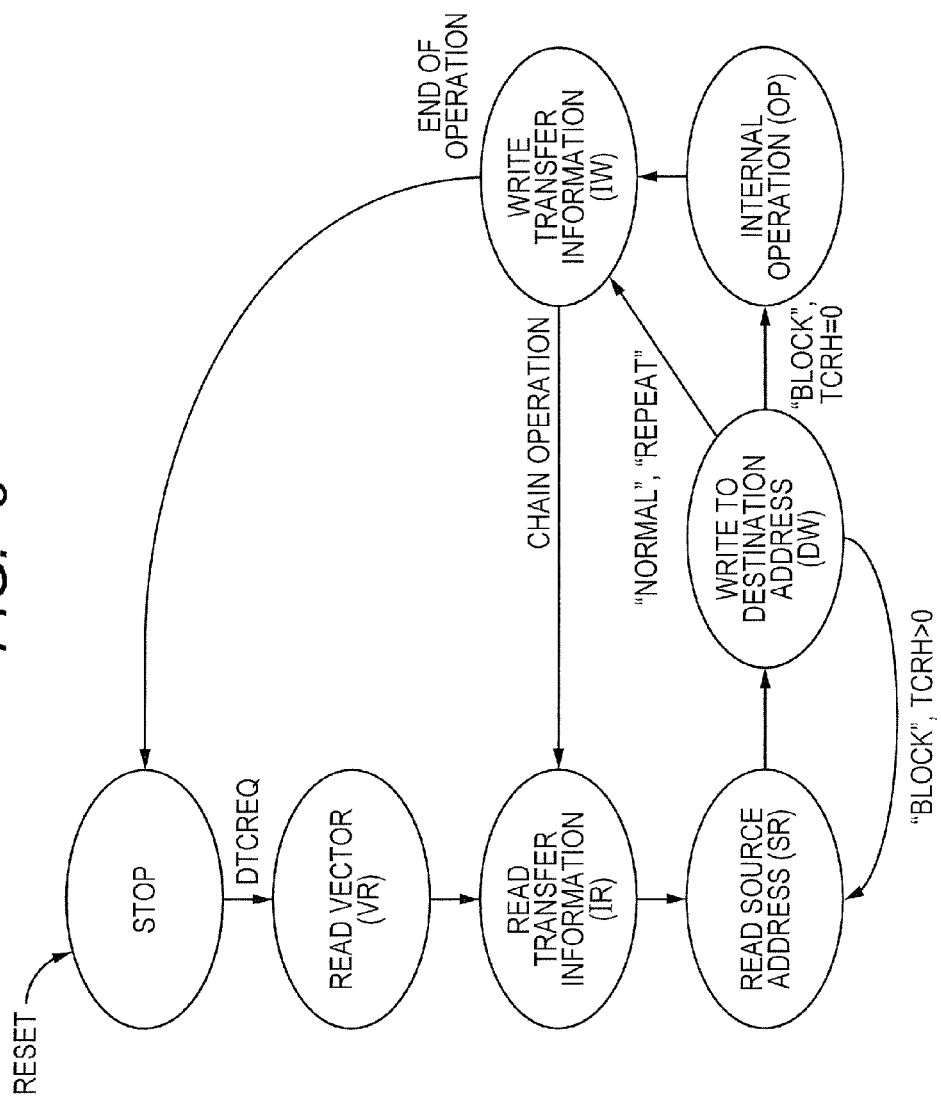

FIG. 9

| BLOCK | DATA IN BLOCK | INTERNAL BUS BS3 ALU OUTPUT SELECTION | ALU SELECTION CONDITION | SAR BEFORE EXECUTION | SAR AFTER EXECUTION | TCRH BEFORE EXECUTION | TCRH AFTER EXECUTION | BTCRH BEFORE EXECUTION | BTCRH AFTER EXECUTION | TR AFTER EXECUTION |
|---|---|---|---|---|---|---|---|---|---|---|
| kTH TRANSFER | 1ST | INC | | m | m+1 | n | n−1 | | | n−1 |
| | 2ND | INC | | m+1 | m+2 | n−1 | n−2=1 | | | n−2=1 |
| | 3RD | INC | | m+2 | m+3 | n−2=1 | n | | | 0 |
| | INTERNAL OPERATION | INC−AU | TCRH=0 IS DETECTED | m+3 | m+1 | | (TCRL IS COPIED) | n | n−1 | |
| (k+1)TH TRANSFER | 1ST | INC | | m+1 | m+2 | n | n−1 | | | n−2=1 |
| | 2ND | INC−AU | TR=0 IS DETECTED | m+2 | m | n−1 | n−2=1 | | | 0 |
| | 3RD | INC | | m | m+1 | n−2=1 | n | | | −1 |
| | INTERNAL OPERATION | INC | | m+1 | m+2 | | (TCRL IS COPIED) | n−1 | n−2 | |
| (k+2)TH TRANSFER | 1ST | INC−AU | TR=0 IS DETECTED | m+2 | m | n | n−1 | | | 0 |
| | 2ND | INC | | m | m+1 | n−1 | n−2=1 | | | −1 |
| | 3RD | INC | | m+1 | m+2 | n−2=1 | n | | | −2 |
| | INTERNAL OPERATION | INC−AU | BTCR=0 IS DETECTED | m+2 | m | | (TCRL IS COPIED) | | (BTCRL IS COPIED) | |

FIG. 10

| BLOCK | DATA IN BLOCK | INTERNAL BUS BS3, ALU OUTPUT SELECTION | SAR BEFORE EXECUTION | SAR AFTER EXECUTION | TCRH BEFORE EXECUTION | TCRH AFTER EXECUTION | BTCRH BEFORE EXECUTION | BTCRH AFTER EXECUTION | TR AFTER EXECUTION |
|---|---|---|---|---|---|---|---|---|---|
| kTH TRANSFER | 1ST | INC | m | m+1 | n | n-1 | ni | ni-1 | ni-1 |
|  | 2ND | INC | m+1 | m+2 | n-1 | n-2=1 |  |  | ni-2 |
|  | 3RD | INC | m+2 | m+3 | n-2=1 | n |  |  | ni-2 |
|  | INTERNAL OPERATION | INC-AU | m+3 | m+1 |  | (TCRL IS COPIED) |  |  |  |
| (k+1)TH TRANSFER | 1ST | INC | m+1 | m+2 | n | n-1 | ni-1 | ni-2 | ni-2 |
|  | 2ND | INC-AU | m+2 | m+3 | n-1 | n-2=1 |  |  | ni-3 |
|  | 3RD | INC | m+3 | m+4 | n-2=1 | n |  |  | ni-4 |
|  | INTERNAL OPERATION | INC-AU | m+4 | m+2 |  | (TCRL IS COPIED) |  |  |  |
| (k+2)TH TRANSFER | 1ST | INC | m+2 | m+3 | n | n-1 | ni-2 | ni-3 | ni-3 |
|  | 2ND | INC | m+3 | m+4 | n-1 | n-2=1 |  |  | ni-4 |
|  | 3RD | INC | m+4 | m+5 | n-2=1 | n |  |  | ni-5 |
|  | INTERNAL OPERATION | INC-AU | m+5 | m+3 |  | (TCRL IS COPIED) |  |  |  |
| ... |  |  |  |  |  |  |  |  |  |
| (k+ni-3)TH TRANSFER | 1ST | INC | m+ni-3 | m+ni-2 | n | n-1 | 3 | 2 | 2 |
|  | 2ND | INC | m+ni-2 | m+ni-1 | n-1 | n-2=1 |  |  | 1 |
|  | 3RD | INC | m+ni-1 | m+ni | n-2=1 | n |  |  | 0 |
|  | INTERNAL OPERATION | INC-AU | m+ni | m+ni-2 |  | (TCRL IS COPIED) |  |  |  |
| (k+ni-2)TH TRANSFER | 1ST | INC | m+ni-2 | m+ni-1 | n | n-1 | 2 | 1 | 1 |
|  | 2ND | INC-AU | m+ni-1 | m | n-1 | n-2=1 |  |  | 0 |
|  | 3RD | INC | m | m+1 | n-2=1 | n |  |  | -1 |
|  | INTERNAL OPERATION | INC-AU | m+1 | m+2 |  | (TCRL IS COPIED) |  |  |  |
| (k+ni-1)TH TRANSFER | 1ST | INC-AU | m+ni-1 | m | n | n-1 | 1 |  | 0 |
|  | 2ND | INC | m | m+1 | n-1 | n-2=1 |  |  | -1 |
|  | 3RD | INC | m+1 | m+2 | n-2=1 | n |  |  | -2 |
|  | INTERNAL OPERATION | INC-AU | m+2 | m |  | (TCRL IS COPIED) |  | ni (BTCRL IS COPIED) |  |

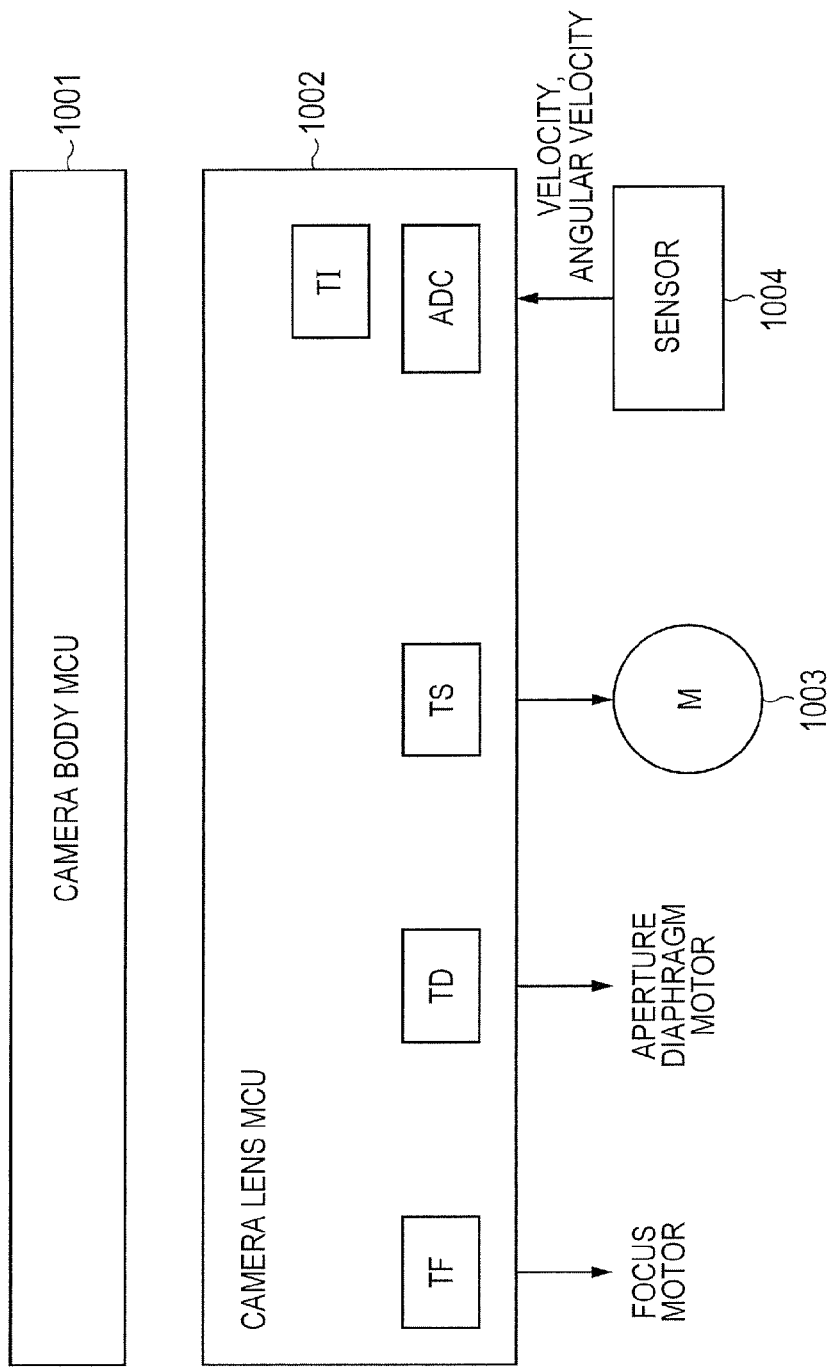

SEMICONDUCTOR DEVICE

CROSS-REFERENCE TO RELATED APPLICATIONS

The disclosure of Japanese Patent Application No. 2013-266791 filed on Dec. 25, 2013 including the specification, drawings, and abstract is incorporated herein by reference in its entirety.

BACKGROUND

The present invention relates to a semiconductor device and especially to a microcomputer, for example.

Generally, a single chip microcomputer includes a CPU (Central Processing Unit) as a central element, a ROM (Read Only Memory) for program storage, a RAM (Random Access Memory) for data storage, and an input/output circuit to input and output data or a signal. These functional blocks are formed over one semiconductor substrate. Such a single chip microcomputer is employed for various kinds of appliance controls.

In the appliance control by a single chip microcomputer, there is a request of data transfer in response to events, such as an interrupt. A CPU can execute arbitrary processing with the combination of commands. However, in the case of processing an interrupt, in order to switch the flow of processing, it is necessary to perform an exceptional treatment, saving and restoring processing of a stack, and execution of a restore command. In this case, the operating time of the CPU, such as command read in data transfer, tends to be prolonged.

In order to solve the problem in the data transfer, Patent Literature 1 proposes a technology in which a data transfer controller is provided in a single chip microcomputer to perform data transfer in response to requests from a large number of peripheral processing units (input/output circuits) with a small number of hardware. In the technology, a storage device (RAM) stores data transfer information such as the source address which indicates the position of a memory where the data to be transferred is stored. A vector table is also provided to store the address which indicates where all the information necessary for the data transfer is stored in the storage device (RAM). There are provided a means which refers to the contents of the vector table corresponding to a start request when the start request of data transfer occurs, and a means which obtains all the information necessary for the data transfer from the contents of the vector table. In the present technology, it is possible to realize the data transfer with a small number of hardware; however, the contents of the data transfer are not taken into consideration.

As compared with this, in order to expand the application range of the data transfer in a data transfer controller, Patent Literature 2 proposes a technology of performing different types of data transfer depending on the modes of data transfer. In the technology, a repeat transfer mode and a block transfer mode are proposed as the mode of data transfer. Accordingly, it is possible to control the address of a transfer destination and a transfer source, and to select a transfer count, etc. For example, when the present technology is applied to a system such as a printer, it becomes possible to control a stepping motor and the printing data of the printer. It is also appropriately applies to the storage of receive data to a memory. In the technology, the data transfer information is stored as hardware for exclusive use in the data transfer controller and it is possible to select the configuration of transfer information in a short address mode or a full address mode, in order to utilize the hardware effectively. In the present example, the rotational angle and the shift amount of the stepping motor are in one-to-one correspondence; accordingly, the feedback is unnecessary and it is only necessary to transfer a prescribed number of data in prescribed order. In the technology, either the source address or the destination address is a RAM, etc. However, no consideration is given to the fact that the RAM is utilized while updating the contents stored therein.

Patent Literature 3 proposes a technology in which information necessary for data transfer is stored in a storage device and the data transfer of more than one piece of information can be specified by one operation of a data transfer controller (a chain transfer or chain operation). According to the present technology, it is possible to perform any numbers of data transfer, according to any start factor. Therefore, the present technology can be applied to various applications. As a result, it is possible to improve the degree of freedom in a system configuration and also to improve the usability.

Patent Literature 4 proposes a technology in which a data transfer controller is provided with a built-in arithmetic unit which can perform comparison and simple arithmetic of the data set up in advance and the data to be transferred. In the present technology, the data transfer is performed with a data transfer controller as the exclusive-use hardware; accordingly, it is possible to realize the faster data transfer than by a CPU. As a result, the frequency of the interrupt process of the CPU can be reduced, and efficient processing can be performed.

PATENT LITERATURE (Patent Literature 1) Japanese Unexamined Patent Application Publication No. Hei 1 (1989)-125644

(Patent Literature 2) Japanese Unexamined Patent Application Publication No. Hei 5 (1993)-307516

(Patent Literature 3) Japanese Unexamined Patent Application Publication No. Hei 7 (1995)-129537

(Patent Literature 4) Japanese Unexamined Patent Application Publication No. 2000-194647

SUMMARY

However, the present inventors have found out that the above-described technologies have the following problems. In recent years, the built-in functions and control targets of a microcomputer are increasing, and a higher accuracy in the control of the microcomputer is demanded. Therefore, it is required to perform FIR filter arithmetic and IIR filter arithmetic (FIR stands for Finite Impulse Response and IIR stands for Infinite Impulse Response). Such filter arithmetic is realized by a product sum operation. The filter arithmetic can be performed by a CPU in response to a prescribed interrupt (event) or the like. However, efficient processing of the CPU will be impeded as is the case with the CPU performing data transfer.

Since there are many control targets of the microcomputer, it is necessary for the microcomputer to perform the filter arithmetic for every control target. When a filter arithmetic unit is provided as hardware, it is desirable that one filter arithmetic unit can be utilized for several control targets from a viewpoint of suppressing the increase in the physical scale. In the filter arithmetic, plural pieces of time series data sampled timewise are inputted into the filter arithmetic unit. Therefore, in order to utilize one filter arithmetic unit for plural control targets, it is necessary to supply plural pieces of data to be used to the filter arithmetic unit prior to the filter arithmetic. There are occasions in which the coefficients of the product sum operation is required to be changed for every control target. Therefore, it is also necessary to supply the coefficients of the product sum operation to the filter arithmetic unit prior to the filter arithmetic.

Even if the arithmetic by the filter arithmetic unit can be performed at a high speed, if time is required to supply data to the filter arithmetic unit, it will become a rate-limiting factor of the processing of the filter arithmetic unit. As a result, it becomes difficult to realize the speed enhancement of the processing and control operation of the microcomputer as a whole. Therefore, when the microcomputer performs the arithmetic using plural pieces of data such as the filter arithmetic, it is necessary to establish the technique to efficiently input data to the arithmetic unit.

The other issues and new features of the present invention will become clear from the description of the present specification and the accompanying drawings.

According to one embodiment, a semiconductor device includes a data transfer controller which transfers plural pieces of data from a source address area to a destination address area continuously, based on data transfer information, and an arithmetic unit which performs operation with the concurrent use of the plural pieces of data.

According to one embodiment, it is possible to efficiently supply plural pieces of data necessary for the arithmetic to the arithmetic unit which processes plural pieces of data concurrently.

BRIEF DESCRIPTION OF THE DRAWINGS

FIG. 1A is a block diagram illustrating schematically a configuration of a microcomputer according to Embodiment 1;

FIG. 2 is a drawing illustrating a configuration of data transfer information;

FIG. 4 is a drawing illustrating the outline of a transfer mode;

FIG. 8 is a drawing illustrating a state transition diagram of the data transfer controller (DTC);

FIG. 9 is a drawing illustrating a first example of an internal operation of data transfer of the data transfer controller (DTC) in a shift block mode;

FIG. 10 is a drawing illustrating a second example of the internal operation of data transfer of the data transfer controller (DTC) in the shift block mode;

FIG. 25 is a block diagram illustrating a camera system including a microcomputer (MCU).

DETAILED DESCRIPTION

Hereinafter, the embodiments of the present invention are explained with reference to drawings. In each drawing, the same symbol is attached to the same element and the repeated explanation thereof will be omitted if necessary.

Embodiment 1

Figure 1B:
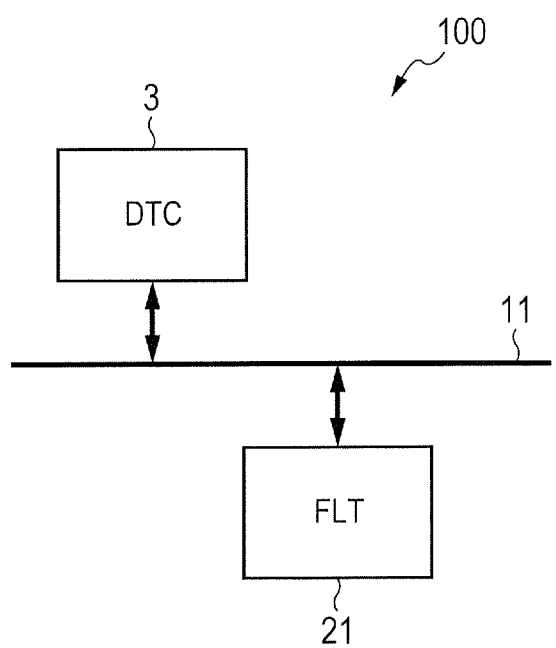
FIG. 1B is a drawing illustrating a portion relating to data transfer in the microcomputer 100 according to Embodiment 1.

A microcomputer 100 according to Embodiment 1 is explained. FIG. 1A is a block diagram illustrating schematically a configuration of the microcomputer 100 according to Embodiment 1. FIG. 1B illustrates a portion relating to data transfer in the microcomputer 100 as a semiconductor device according to Embodiment 1. Hereinafter, the configuration of the microcomputer 100 is explained with reference to FIG. 1A and FIG. 1B. In the following, the microcomputer is written simply as an MCU (Micro Controller Unit).

The MCU 100 includes a central processing unit (CPU) 1, an interrupt controller (INT) 2, a data transfer controller (DTC) 3, a read-only memory (ROM) 4, a random access memory (RAM) 5, a bus controller (BSC) 6, a timer 7, a communication module 8, an analog module 9, an input/output port (I/O) 10, an internal bus 11, a filter arithmetic unit (FLT) 21, and others. As the communication module 8, a serial communication interface is provided, for example. As the analog module 9, an analog/digital (A/D) converter, a digital/analog (D/A) converter are provided, for example.

The principal part in operation of the MCU 100 is the CPU 1. The CPU 1 operates by reading a command mainly from the ROM 4. The DTC 3 performs data transfer instead of the CPU 1, based on a setup by the CPU 1.

In response to an interrupt request from the timer 7, the communication module 8, the analog module 9, etc., and an interrupt request from the I/O 10 based on external interrupt request signals from the exterior of the MCU 100, the INT 2 outputs an interrupt request or a data transfer request to the CPU 1 or the DTC 3. When processing by an interrupt signal is started or completed, the INT 2 outputs an interrupt-clear signal as a signal to clear the interrupt, corresponding to an interrupt signal or an interrupt factor flag of each of the timer 7, the communication module 8, the analog module 9, and the I/O 10.

The BSC 6 receives a bus request signal from the CPU 1 and the DTC 3, performs arbitration to occupancy of the internal bus 11, and outputs a bus use enabling signal. The BSC 6 interfaces a bus request, a bus acknowledge, a bus command, a wait, an address, data, etc. with the CPU 1 and the DTC 3. The BSC 6 accordingly realizes read/write to the RAM, other functional blocks, and modules which are coupled to the internal bus 11.

The FLT 21 is provided with several data registers to which read/write is possible via the internal bus 11, and performs a product sum operation, etc. according to the data supplied to the data registers.

The DTC 3 performs data transfer based on data transfer information as described above. FIG. 2 illustrates a configuration of the data transfer information. The data transfer information includes a mode register (also called MR), a source address register (also called SAR), a destination address register (also called DAR), and a transfer count register (also called CR).

The MR specifies a mode of the data transfer performed by the DTC 3. The DTC 3 utilizes necessary data from the SAR, the DAR, and the CR according to the mode of the data transfer specified by the MR.

The CR is divided into a block transfer count register (also called BTCR) and a transfer count register (also called TCR). The BTCR is divided into an 8-bit BTCRH and an 8-bit BTCRL. The TCR is divided into an 8-bit TCRH and an 8-bit TCRL.

As for these registers, a one-group worth of circuit exists inside the DTC 3, and, although not restricted in particular, these registers do not exist in the address space of the CPU 1. As for the data transfer information which should be stored in these registers, the necessary number of groups is arranged in a data transfer information allocation area as prescribed in the address space of the CPU 1, such as the RAM 5.

Next, a bit configuration of the MR is explained. Bit 15 and Bit 14 of the MR are an SM1 bit and an SM0 bit, respectively, and specify whether the SAR is incremented, decremented, or fixed after the data transfer.

Bit 13 and Bit 12 of the MR are a DM1 bit and a DM0 bit, respectively, and specify whether the DAR is incremented, decremented, or fixed after the data transfer.

Bit 11 of the MR is a DIR bit and specifies the address control of a transfer source or a transfer destination.

Bits 10-8 of the MR are a TMD2 bit, a TMD1 bit, and a TMD0 bit, respectively, and specify the transfer mode of data. When the TMD2-TMD0 bits are "000", the transfer mode is a normal mode. When the TMD2-TMD0 bits are "001", the transfer mode is a repeat mode. When the TMD2-TMD0 bits are "100", the transfer mode is a block transfer mode. When the TMD2-TMD0 bits are "101", the transfer mode is a dual block mode. When the TMD2-TMD0 bits are "110", the transfer mode is a shift block mode. The details of each transfer mode are described later.

Bit 7 and Bit 6 of the MR are an Sz1 bit and an Sz0 bit, respectively, and specify by which of byte size, word size, and a long-word size the data transfer is performed.

Bit 1 of the MR is an NXTE1 bit and specifies whether the data transfer is terminated or the next data transfer is performed, according to one start factor. When the NXTE1 bit is cleared to 0, after the read of data transfer information and the data transfer, the data transfer information is written and the operation of the DTC 3 is terminated. When the NXTE1 bit is set to 1, after the read of data transfer information and the data transfer, the data transfer information is written. Furthermore, the data transfer information is read from the continued address. Then, after the data transfer specified by the present data transfer information is performed, the data transfer information is written. In this way, the operation to perform a series of processing of the write of data transfer information, the data transfer, and the write of data transfer information multiple times in succession is called a chain operation. Bit 0 of the MR is an NXTE0 bit and specifies whether the chain operation is performed or not when the CR is decreased to 0.

Figure 3:
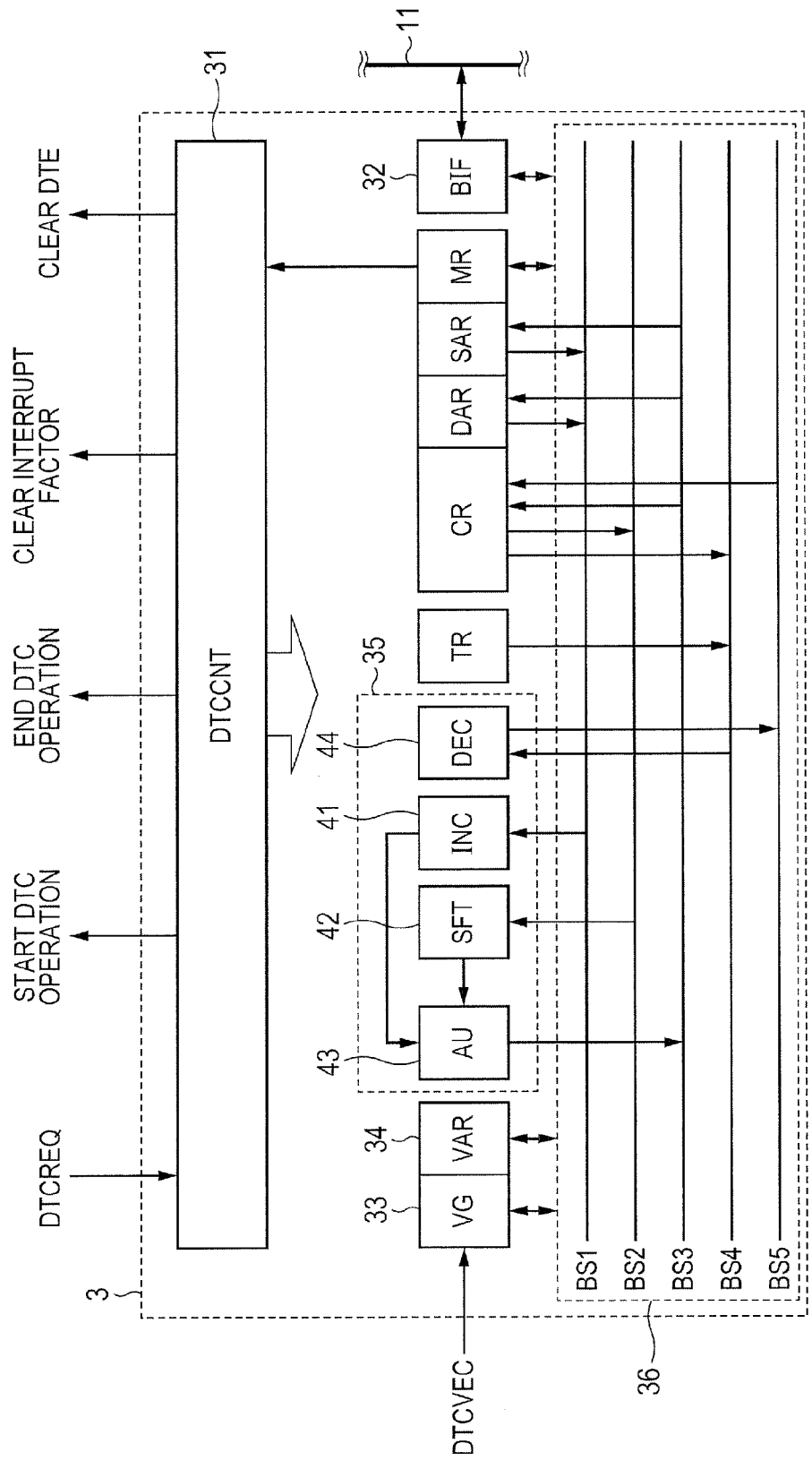
FIG. 3 is a block diagram illustrating schematically a configuration of a data transfer controller (DTC)

The configuration of the DTC 3 is explained. FIG. 3 is a block diagram illustrating schematically the configuration of the DTC 3. The DTC 3 includes a data transfer control block (also called DTCCNT) 31, a bus interface (also called BIF) 32, a vector generation block (also called VG) 33, a vector address register (also called VAR) 34, an MR, an SAR, a DAR, a CR, a temporary register (also called TR), an arithmetic unit (also called ALU) 35, and an internal bus 36. The internal bus 36 includes internal buses BS1-BS5.

The DTCCNT 31 controls the DTC 3 based on a start request signal DCTREQ from the INT 2 and the data of the MR.

The BIF 32 interfaces between the internal bus 36 of the DTC 3 and the internal bus 11 of the MCU 100. The present interface includes a bus request, a bus acknowledge, a bus command, a wait, an address, data, etc.

The VG 33 generates a vector address according to a vector number DTCVEC supplied from the INT 2. For example, the VG 33 quadruples the vector number DTCVEC and adds a prescribed offset.

The VAR 34 stores the start address of the data transfer information read from the vector address.

The MR, the SAR, the DAR, and the CR store the data transfer information read sequentially from the start address of the data transfer information.

The ALU 35 has functions such as logical, shift, and arithmetic operations, and performs these operations in the given order.

The data of the SAR, the DAR, the CR, and the TR can be supplied to the ALU 35 via the internal buses BS1-BS5. The ALU 35 performs operations based on the supplied information.

The ALU 35 is explained in the following. The ALU 35 includes an incrementer (also called INC) 41, a shifter (also called SFT) 42, an arithmetic operation unit (also called AU) 43, and a decrementer (also called DEC) 44. In addition, it is also possible to provide a logic unit, etc. in the ALU 35.

Address output for the read of a source address and the write of a destination address is performed using the internal bus BS1. The INC 41 performs the increment/decrement of the SAR and the DAR, based on the specification by the SM1 bit, the SM0 bit, the DM1 bit, and the DM0 bit, which are inputted via the internal bus BS1. The INC 41 stores the result after performing the increment/decrement of the SAR and the DAR into the SAR and the DAR via the internal bus BS3, respectively.

The SFT 42 shifts the data of the TCRL, based on the Sz1 bit and the Sz0 bit, inputted via the internal bus BS2. The AU 43 adds or subtracts the output of the INC 41 and the output of the SFT 42. The AU 43 stores the arithmetic result in the SAR or the DAR via the internal bus BS3.

The data of the CR, the TCRH, the TR, and the BTCR are outputted to the internal bus BS4. The DEC 44 decrements the CR, the TCRH, the TR, and the BTCR which are inputted via the internal bus BS4. Then, the DEC 44 stores the decrement result of the CR, the TCRH, the TR, and the BTCR in each of the CR, the TCRH, the TR, and the BTCR via the internal bus BS5.

Next, a transfer mode is explained. FIG. 4 illustrates the outline of the transfer mode.

Normal Mode

When the TMD2-TMD0 bits are "000", the transfer mode is the normal mode. In the normal mode, by one startup, one data transfer is performed from the source address indicated by the SAR to the destination address indicated by the DAR. After the end of the data transfer, the SAR is incremented, decremented, or fixed, in response to the SM1 bit and the SM0 bit. The DAR is incremented, decremented, or fixed, in response to the DM1 bit and the DM0 bit. Subsequently, the TCR is decremented.

In the normal mode, whenever the start factor occurs, the data transfer and the register manipulation explained above are repeated only the number of counts specified by the TCR After the repetitive operation has been performed for the number of counts specified by the CR, the interrupt used as the start factor is requested to the CPU.

Repeat Mode

When the TMD2-TMD0 bits are "001", the transfer mode is the repeat mode. When the DIR bit is cleared to 0, the source address is set up as a repeat area. When the DIR bit is set to 1, the destination address is set up as a repeat area. In the repeat mode, the TCRH is used as the transfer count register and the TCRL is used as the transfer count holding register. The size of the repeat area is specified by the TCRH. Before the start of the data transfer, the same value is set to the TCRH and the TCRL as an initial setting value.

In the repeat mode, by one startup, one data transfer is performed from the source address indicated by the SAR to the destination address indicated by the DAR. After the end of the data transfer, the SAR is incremented, decremented, or fixed, in response to the SM1 bit and the SM0 bit. The DAR is incremented, decremented, or fixed, in response to the DM1 bit and the DM0 bit. Subsequently, the TCR (TCRH) is decremented. In the repeat mode, whenever the start factor occurs, the data transfer and the register manipulation explained above are repeated for the number of counts specified by the TCR (TCRH and TCRL).bit The TCRH is set to 0 after the data transfer of the specified number of counts is completed. Subsequently, based on the data stored in the TCRL, the initial setting value of some or all of the SAR, the DAR, and the TCRH is recovered.

When the TCRH is decreased to 0, the data of the TCRL is transferred to the TCRH of the transfer count register. Accordingly, the TCRH is recovered to the initial setting value. The SAR or the DAR is recovered to the initial setting value by the following operations.

When the DIR bit is set to 1, the operation OP1 shown by Equation (1) is performed, and the SAR is recovered to the initial setting value.

[Mathematical 1]

$$OP1=SAR+SM1\cdot(-1)^{SM0}\cdot2^{Sz}\cdot TCRL \quad (1)$$

When the DIR bit is cleared to 0, the operation OP2 shown by Equation (2) is performed, and the DAR is recovered to the initial setting value.

[Mathematical 2]

$$OP2=DAR+DM1\cdot(-1)^{DM0}\cdot2^{Sz}\cdot TCRL \quad (2)$$

In order to perform the above-described operation, the data of the TCRL is inputted into the ALU 35 via the internal bus BS2, with respect to the SAR or the DAR specified as the repeat area. Then, the SFT 42 shifts the TCRL based on the specification of the Sz1 bit and the Sz0 bit, the AU 43 adds or subtracts the output of the SFT 42 and the output of the INC 41, thereby realizing the operation.

Block Transfer Mode

When the TMD2-TMD0 bits are "100", the transfer mode is the block transfer mode. When the DIR bit is cleared to 0, the source address is set up as a block area. When the DIR bit is set to 1, the destination address is set up as a block area. In the block transfer mode, the SAR is used as a source address register, the DAR as a destination address register, the TCRH (8 bits) as a block size count register, the TCRL as a block size holding register, and the BTCR as a block transfer count register.

In the block transfer mode, by one startup, a block-size worth of data transfer is performed from the source address indicated by the SAR to the destination address indicated by the DAR. For every data transfer, the SAR is incremented, decremented, or fixed, in response to the SM1 bit and the SM0 bit. The DAR is incremented, decremented, or fixed, in response to the DM1 bit and the DM0 bit. Subsequently, the TCR (TCRH) is decremented.

The TCRH is decreased to 0 after the data transfer of the specified number of counts is completed. In this case, as is the case with the repeat mode, the initial setting value of some or all of the SAR, the DAR, and the TCRH is recovered based on the data stored in the TCRL.

After the data transfer of the block area is completed, the BTCR (BTCRH and BTCRL) is decremented. In the block transfer mode, whenever a start factor occurs, the data transfer of the block area explained above is repeated for the number of counts specified by the BTCR (BTCRH and BTCRL) (until the BTCR is decreased to 0).

When the data transfer for the block area is completed, the BTCRH is decremented. When the BTCRH is decremented to 0, the initial setting value of the BTCRH is recovered based on the data held in the BTCRL.

Dual Block Mode

When the TMD2-TMD0 bits are "101", the transfer mode is the dual block mode. In the dual block mode, the source address and the destination address serve as a block area irrespective of the value of the DIR bit. In the dual block mode, as is the case with the block transfer mode, the SAR is used as a source address register, the DAR as a destination address register, the TCRH (8 bits) as a block size count register, the TCRL as a block size holding register, and the BTCR as a block transfer count register.

As is the case with the block transfer mode, in the dual block mode, a block-size worth of data transfer is performed by one startup, from the source address indicated by the SAR to the destination address indicated by the DAR. For every data transfer, the SAR is incremented, decremented, or fixed, in response to the SM1 bit and the SM0 bit. The DAR is incremented, decremented, or fixed, in response to the DM1 bit and the DM0 bit. Subsequently, the TCR (TCRH) is decremented.

The TCRH is set to 0 after the data transfer of the specified number of counts is completed. In this case, as is the case with the repeat mode, the initial setting value of some or all of the SAR, the DAR, and the TCRH is recovered based on the data stored in the TCRL.

After the data transfer of the block area is completed, the BTCR (BTCRH and BTCRL) is decremented. In the dual block mode, whenever a start factor occurs, the data transfer of the block area explained above is repeated for the number of counts specified by the BTCR (BTCRH and BTCRL) (until the BTCR is decreased to 0).

When the data transfer for the block area is completed, the BTCRH is decremented. When the BTCRH is decremented to 0, the initial setting value of the BTCRH is recovered based on the data held in the BTCRL.

Shift Block Mode

When the TMD2-TMD0 bits are "110", the transfer mode is the shift block mode. When the DIR bit is cleared to 0, the source address is set up as a block area with rotation and the destination address is set up as a block area. When DIR bit is set to 1, the source address is set up as a block area and the destination address is set up as a block area with rotation. As is the case with the block transfer mode, in the shift block mode, the SAR is used as a source address register, the DAR as a destination address register, the TCRH (8 bits) as a block size count register, the TCRL as a block size holding register, and the BTCR as a block transfer count register.

As is the case with the block transfer mode, in the shift block mode, a block-size worth of data transfer is performed by one startup, from the source address indicated by the SAR to the destination address indicated by the DAR. For every data transfer, the SAR is incremented, decremented, or fixed, in response to the SM1 bit and the SM0 bit. The DAR is incremented, decremented, or fixed, in response to the DM1 bit and the DM0 bit. Subsequently, the TCR (TCRH) is decremented.

The TCRH is set to 0 after the data transfer of the specified number of counts is completed. In this case, as is the case with the repeat mode, the initial setting value of some or all of the SAR, the DAR, and the TCRH is recovered based on the data stored in the TCRL.

After the data transfer of the block area is completed, the BTCR (BTCRH and BTCRL) is decremented. In the block transfer mode, whenever a start factor occurs, the data transfer of the block area explained above is repeated for the number of counts specified by the BTCR (BTCRH and BTCRL) (until the BTCR is decreased to 0).

The block area with rotation returns the SAR or the DAR to the start address of the block area with rotation based on the data stored in the BTCRL, after the last data transfer is performed.

When the data transfer for the block area is completed, the BTCRH is decremented. When the BTCRH is decremented to 0, the initial setting value of the BTCRH is recovered based on the data held in the BTCRL.

In the case of the shift block mode, the SAR or the DAR specified as the block area with rotation is outputted to the internal bus BS1 after the end of data of the prescribed block, and increment/decrement is performed by the INC 41. Furthermore, the data of the TCRL is inputted into the ALU 35 via the internal bus BS2, shifted by the SFT 42 based on the specification of the Sz1 bit and the Sz0 bit, and added or subtracted with the output of the INC 41. The arithmetic result is stored in the SAR or the DAR via the internal bus BS3.

The initialization of the SAR or the DAR can be realized by replacing the TCRL with the BTCRL in the operation performed by Equations (1) and (2) described above.

Figure 5:
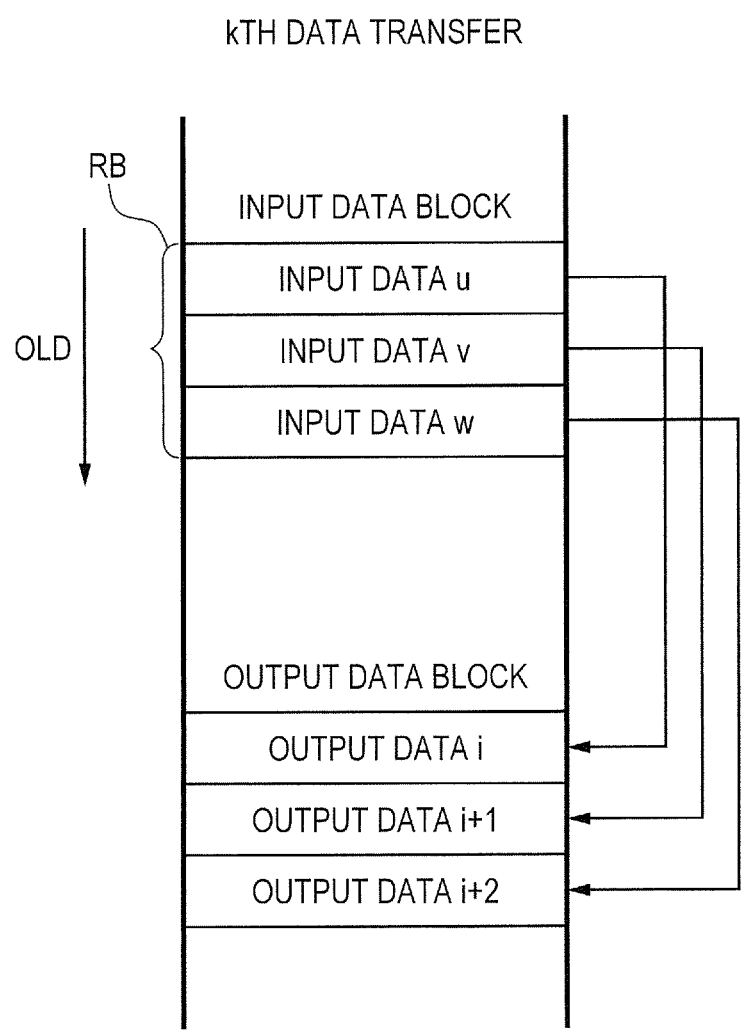
FIG. 5 is a drawing illustrating a data transfer operation of the data transfer controller (DTC) in a shift block mode.
Figure 6:
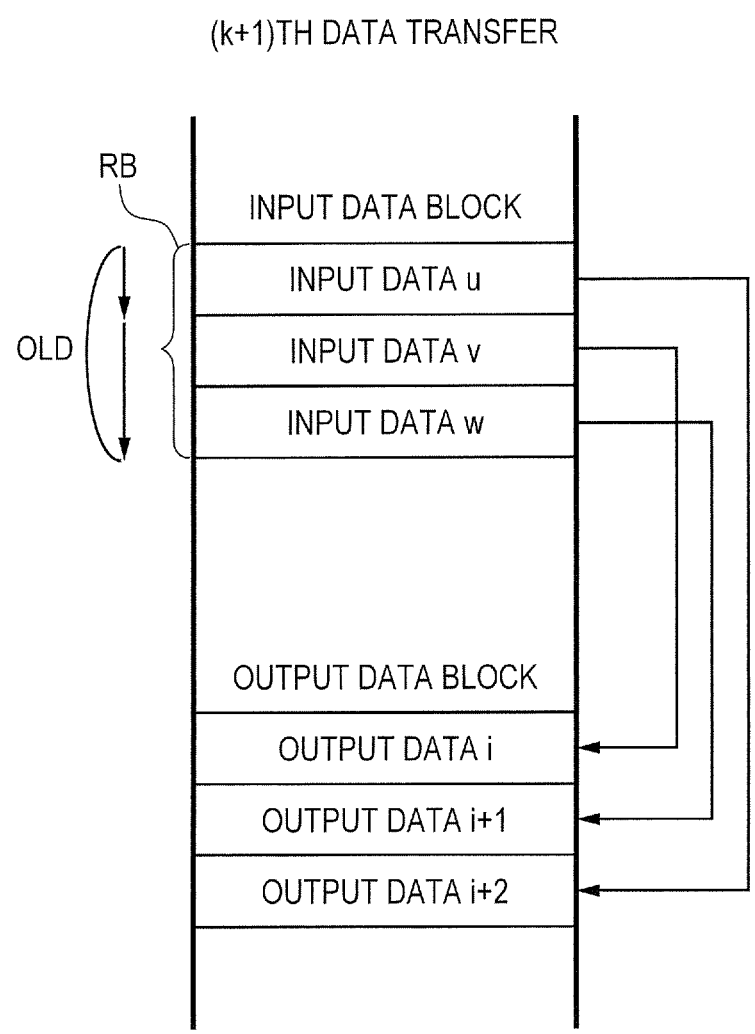
FIG. 6 is a drawing illustrating a data transfer operation of the data transfer controller (DTC) in a shift block mode.
Figure 7:
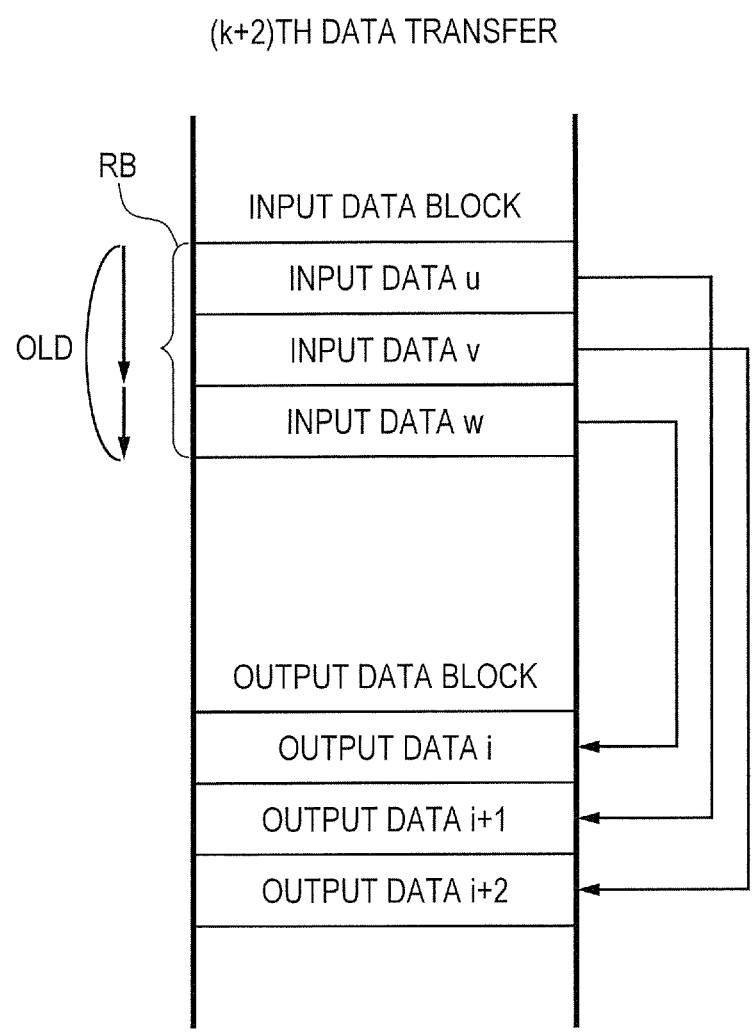
FIG. 7 is a drawing illustrating a data transfer operation of the data transfer controller (DTC) in a shift block mode.

The shift block mode is explained in further detail. FIGS. 5-7 illustrate data transfer operations of the data transfer controller (DTC) in the shift block mode. FIG. 5 illustrates the kth data transfer, FIG. 6 illustrates the (k+1)th data transfer, and FIG. 7 illustrates the (k+2)th data transfer.

In the shift block mode, it is possible to perform the data transfer to the output data block for each startup of the DTC 3, in order of old data of the input data block for example. In this transfer mode, whenever the transfer of one input data block completes, one item of data in the block is updated. Specifically, whenever the transfer of one data block completes, the order of the data in the input data block is moved down and the oldest data is abolished. Then, the data at the top which has become a vacancy by the moving down is updated by new data. This kind of updating of the input data block can be realized by means of the data transfer in the above-described repeat mode. Therefore, the detailed explanation thereof is omitted.

FIGS. 5-7 are an example of the case where the block size is 3 and the DIR bit is 0. In the present case, the address of the source address serves as a block area with rotation (indicated as RB in FIGS. 5-7), and the destination address serves as a block area.

At the time of the kth data transfer (k is a positive integer) in the shift block mode, input data u, v, and w are stored in the input data block. Among these, the input data u is the oldest data, the input data v is the next older data, and the input data w is the newest data.

In the shift block mode, the DTC 3 reads the input data u, the input data v, and the input data w in this order, and writes them respectively into the output data i, the output data i+1, and the output data i+2 of the output data block.

Subsequently, the input data block is updated. At this time, the oldest input data u is replaced. Then, in the (k+1) th data transfer in the shift block mode, the order of read is shifted per data (rotation), and the DTC 3 reads the input data v, the input data w, and the input data u in this order, and writes them respectively into the output data i, the output data i+1, and the output data i+2 of the output data block.

Similarly, at every startup, the order of read of the block area with rotation (input data block) is shifted per data, and the data transfer of a block size is performed. In other words, it is possible to utilize a general-purpose memory as a FIFO, by using the repeat mode for the write of input data and using the shift block mode for the read of input data. It is possible to realize a FIFO as hardware. However, in that case, the number and size of the FIFO will be fixed. As compared with this, the utilization of the DCT allows to configure a FIFO of an arbitrary number and an arbitrary size.

FIG. 8 illustrates a state transition diagram of the DTC 3. The state transition illustrated in FIG. 8 is implemented mainly in the data transfer control block (DTCCNT) 31 of the DTC 3.

When a start request signal DTCREQ is supplied from the INT 2, the DTC 3 makes a transition to a state VR. After the transition to the state VR, the DTC 3 reads the start address of the data transfer information stored in the vector area (a data transfer information start address arrangement area), based on the vector address generated by the VG 33 according to the vector number DTCVEC. The DTC 3 stores the read data in the VAR 34.

Next, the DTC 3 makes a transition to a state IR. The DTC 3 reads the data transfer information stored in the data transfer information arrangement area according to the start address read in the state VR. At this time, the DTC 3 reads the MR, the SAR, the DAR, and the CR.

The DTC 3 makes a transition to a state SR and a state DW, when performing the data transfer in the normal mode or the repeat mode, according to the data of the MR. In FIG. 8, the transition in the case of performing data transfer in the normal mode or the repeat mode is expressed as "normal" and "repeat." In the state SR, the DTC 3 reads the data of the source address according to the data of the SAR. The DTC 3 increments the SAR, for example, according to the data of the MR. In the state DW, the DTC 3 writes the read data to the destination address according to the data of the DAR. The DTC 3 increments the DAR and decrements the CR, for example, according to the data of the MR. Subsequently, the DTC 3 makes a transition to a state IW. In the state IW, the DTC 3 writes back the MR, the SAR, the DAR, and the CR to the data transfer information arrangement area according to the data of the VAR 34. However, it is possible not to write what has not been updated in the state IW among the MR, the SAR, the DAR, and the CR. For example, when the DAR is fixed, the write of the DAR is not performed.

When not performing the chain operation, the DTC 3 clears the interrupt factor flag or a DTE bit used as the start factor according to the data of the CR, terminates the operation, and returns to a halt state.

When performing the chain operation, it is possible to perform another data transfer after returning from the state IW to the state IR.

The DTC 3 makes a transition to the state SR and the state DW, when performing the data transfer in the block transfer mode, the dual block mode, or the shift block mode, according to the data of the MR. The state SR and the state DW are the same as described above, accordingly the explanation thereof is omitted. In FIG. 8, the transition in the case of performing the data transfer in the block transfer mode, the dual block mode, or the shift block mode is expressed as "block." Then, the DTC 3 repeats the transition from the state SR to the state DW for the number of counts specified by the TCRH.

When the TCRH is 0 in the state DW, the DTC 3 makes a transition from the state DW to the state OP and then to the state IW. In the state OP, the DTC 3 decrements the BTCR and performs operation of the SAR or DAR specified as the block area with rotation. The subsequent state IW and the chain operation are the same as in the case of the normal mode and the repeat mode. Therefore, the explanation thereof is omitted.

Hereinafter, the data transfer of the DTC 3 in the shift block mode is explained concretely. FIG. 9 illustrates a first example of an internal operation of the data transfer of the DTC 3 in the shift block mode. In the present example, the number of the input data to be held is the same as the block size.

In an initial state, the start address m of an input data block (corresponding to the input data u) is set to the SAR, and the block size n (3 in the present embodiment) is set to the BTCRH, the BTCRL, the TCRH, and the TCRL, respectively.

The initial state or the same state as the initial state is assumed to be the kth startup of the DTC 3. At the time of starting of the DTC 3, the SAR is m and the BTCRH is n. By decrementing the data of the TCRH by the DEC 44 of the ALU 35 and incrementing the data of the SAR by the INC 41 of the ALU 35, three data transfers specified by the block size are performed. At the same time, the data of the BTCRH is decremented by the DEC 44 of the ALU 35, holding the data of the BTCRH in the TR.

After the third data transfer, the data (m+2) of the SAR is incremented by the INC 41 of the ALU 35 to a value (m+3). Furthermore, the decrement result of the TCRH is decreased to 0 and the transfer of the block data is completed. Therefore, an operation of the INC 41-AU 43 is specified in the state OP (internal operation), and the result is incremented to (m+4) by the INC 41, and the data of the TCRL is subtracted. The result (m+1) is stored in the SAR. The data of the TCRL is copied to the TCRH. The BTCRH is decremented.

At the time of the (k+1) th starting of the DTC, the SAR is m+1 and the BTCRH is n−1. Except these, three data transfers are performed similarly.

After the second data transfer, the decrement result of the TR is decreased to 0, accordingly, an operation of the INC 41-AU 43 is specified, the data (m+2) of the SAR is incremented by the INC 41 of the ALU 35 to the result (m+3), and the data of BTCRL is subtracted. The result (m) is stored in the SAR.

The decrement result of the TCRH becomes 0 after the third data transfer, accordingly, in the state OP (internal operation), the data of the TCRL is copied to the TCRH. The BTCRH is decremented.

In this case, the data of TCRL is subtracted at the time of the second data transfer, and the BTCRH is not 0; accordingly, the data (m) of the SAR is incremented to (m+1) by the INC 41 of the ALU 35. The result (m+2), incremented further by the INC 41, is stored in the SAR.

At the time of the (k+2) th starting of the DTC, the SAR is m+2 and the BTCRH is n−2 (1 in the present embodiment). Except these, three data transfers are performed similarly.

The decrement result of the TCRH becomes 0 after the first data transfer. Therefore, an operation of the INC 41-AU 43 is specified, the data (m+2) of the SAR is incremented by the INC 41 of the ALU 35 to the result (m+3), and the data of BTCRL is subtracted. The result (m) is stored in the SAR.

The decrement result of the TCRH becomes 0 after the third data transfer. Therefore, in the state OP (internal operation), the data of the TCRL is copied to the TCRH. The BTCRH is decremented to 0. Therefore, the data of the BTCRL is copied to the BTCRH.

The data (m+1) of the SAR is incremented by the INC 41 of the ALU 35 to the result (m+2), and the BTCRH is decreased to 0. Corresponding to this, the operation of the INC 41-AU 43 is specified, the data (m+2) of the SAR is incremented by the INC 41 of the ALU 35 to the result (m+3), and the data of BTCRL is subtracted. The result (m) is stored in the SAR.

Next, another example of the data transfer of the DTC 3 in the shift block mode is explained concretely. FIG. 10 illustrates a second example of an internal operation of the data transfer of the DTC 3 in the shift block mode. In the present example, the number of input data (ni) to be held is larger than the block size (n).

In an initial state, the start address m of an input data block (corresponding to the input data u) is set to the SAR, the number of input data ni is set to the BTCRH and the BTCRL, and the block size n (3 in the present embodiment) is set to the TCRH and the TCRL.

The initial state or the same state as the initial state is assumed to be the kth startup of the DTC 3. At the time of starting of the DTC 3, the SAR is m and the BTCRH is ni. As is the case with the example illustrated in FIG. 9, by decrementing the data of the TCRH by the DEC 44 of the ALU 35 and incrementing the data of the SAR by the INC 41 of the ALU 35, three data transfers specified by the block size are performed. At the same time, the data of the BTCRH is decremented by the DEC 44 of the ALU 35, holding the data of the BTCRH in the TR.

At the time of the (k+1)th starting of the DTC, the SAR is m+1 and the BTCRH is ni−1. Then, three data transfers are performed as is the case with the kth starting.

At the time of the (k+2)th starting of the DTC, the SAR is m+2 and the BTCRH is ni−2. Then, three data transfers are performed as is the case with the kth starting.

The decrement result of the TR becomes 0 after the first data transfer. Accordingly, the data (m+2) of the SAR is incremented by the INC 41 of the ALU 35 to the result (m+3), and the data of TCRL is subtracted. The result (m) is stored in the SAR.

The decrement result of the TCRH becomes 0 after the third data transfer. Therefore, the data of the TCRL is copied to the TCRH. Furthermore, the BTCRH is 1 and is decremented to 0. The data (m+1) of the SAR is incremented by the INC 41 of the ALU 35 to the result (m+2), and the data of the TCRL is subtracted. The result (m−1) is incremented to the result (m) by the INC 41 of the ALU 35. The result (m) is stored in the SAR.

When the BTCRH is decremented to 0, the data of the BTCRL is copied to the BTCRH.

Figure 11:
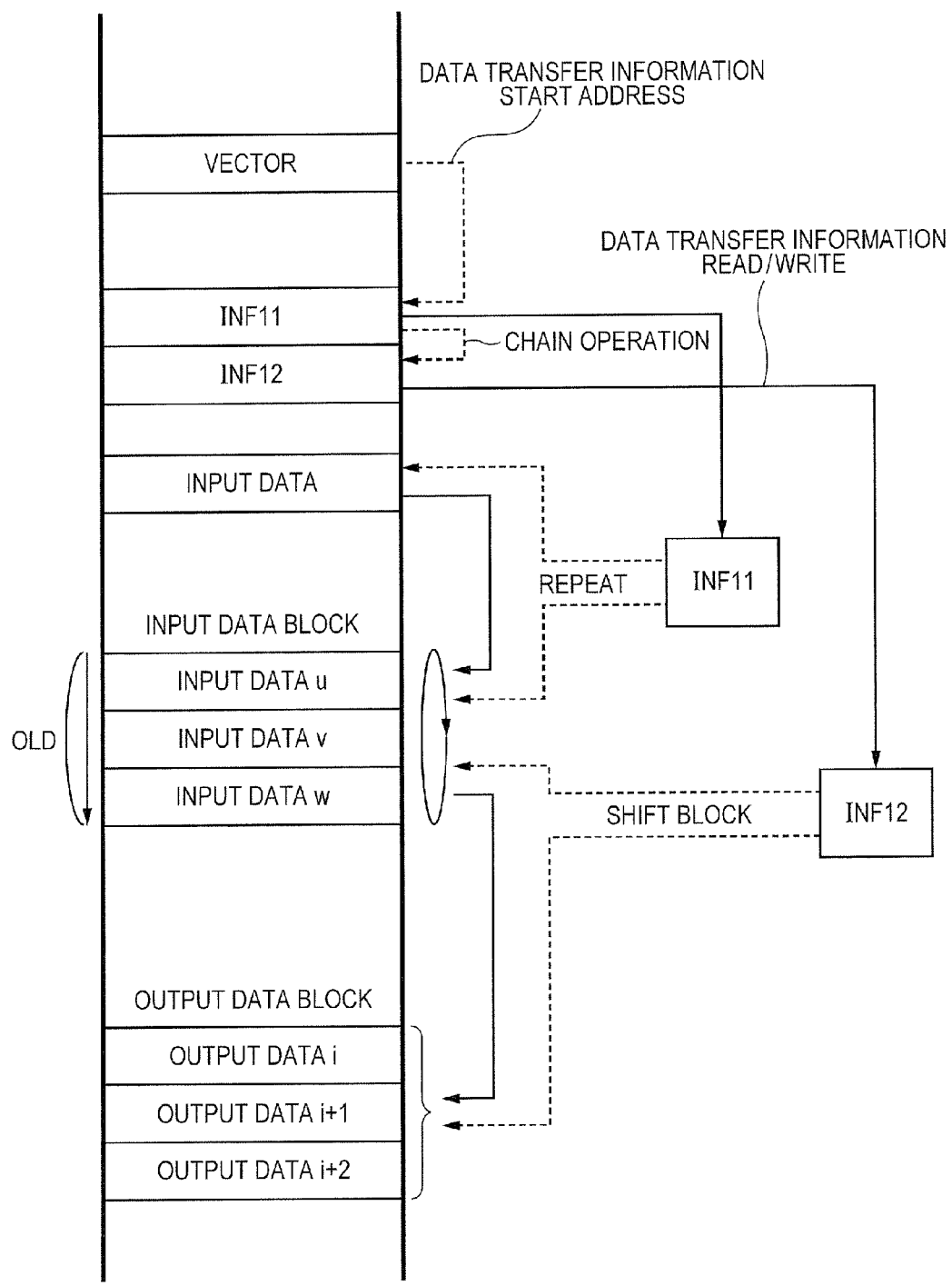
FIG. 11 is a drawing illustrating an example of a data transfer operation of the data transfer controller (DTC) in the shift block mode.

FIG. 11 illustrates an example of a data transfer operation of the DTC 3 in the shift block mode. In FIG. 11, a dashed line arrow indicates specification of an address and a solid line arrow indicates a data transfer. In the present example, the number of the input data to be held is the same as the block size. In the present example, data transfer to the input data block and data transfer from the input data block to the output data block are continuously performed by the chain operation according to the same start factor.

In an initial state, the start address m of the input data block (corresponding to the input data u) is set to the SAR, and the block size n (3 in the present embodiment) is set to the BTCRH, the BTCRL, the TCRH, and the TCRL, respectively.

Then, two data transfers coupled by the chain operation are performed. Here, it is assumed that the data transfer information employed by the first data transfer is data transfer information INF11. It is also assumed that the data transfer information employed by the second data transfer is data transfer information INF12.

The CPU 1 writes the necessary data transfer information to a prescribed transfer information address area, and sets to 1 the DTE bit corresponding to the interrupt factor serving as a start factor. When the interrupt factor concerned occurs in this state and the DTC 3 is started, the DTC 3 reads a data transfer information start address (state VR), and reads the data transfer information INF11 from the data transfer information arrangement area (state IR).

In the data transfer information INF11, the MR sets the TMD2-TMD0 bits to "001" (repeat mode), the DIR bit to 1 (the destination address is set as the repeat area), and the NXTE1 bit to 1 (chain operation).

The DTC 3 reads input data from the address specified by the SAR (state SR). The DTC 3 writes the read input data to the prescribed address of the input data block, specified by the DAR (state DW).

For example, in the setting where the DAR is incremented, when the data transfer is performed for the number of counts (3 in the present embodiment) specified by the TCRL, the DAR return to the start address of the input data block. The operation at this time is expressed by Equation (2) described above.

The DTC 3 decrements the TCRH. Subsequently, the DTC 3 writes the information updated among the data transfer information to the original address (state IW). Specifically, the DTC 3 writes the DAR and the CR to the original address.

Next, the DTC 3 reads the data transfer information INF12 from the address following the address of the data transfer information INF11 (state IR).

The data of the MR in the data transfer information INF12 is as follows. The TMD2-TMD0 bits are "110" (shift block mode), and the DIR bit is cleared to 0 (the source address is assigned as a block area with rotation). The initial setting value of the SAR is shifted by one data from the DAR of the data transfer information INF11. The initial setting value of the BTCRH is smaller by 1 than the initial setting value (3 in the present embodiment) of the BTCRL.

While decrementing the BTCRH and the TCRH, the DTC 3 performs data transfer for the block size specified by the TCRL, from the address of the input data block specified by the SAR to the address of the output data block specified by the DAR (state SR, state DW). When the BTCRH is decreased to 0, the SAR becomes a start address of the block area with rotation, and the BTCRH becomes a block size of the block area with rotation.

When the TCRH is decreased to 0, the DTC 3 returns the data of the DAR and the TCRH to the respective initial setting values (state OP). Subsequently, the DTC 3 writes the information updated among the data transfer information to the original address (state IW). Specifically, the DTC 3 writes the SAR, the DAR, and the CR to the original address.

In the present example, when the DAR of the data transfer information INF11 indicates the address of the input data u, the DAR of the data transfer information INF12 is set to indicate the address of the input data v as the initial setting. Accordingly, the input data u is replaced by the data transfer information INF11, and the older data is in order of the input data v, w, and u. Subsequently, the block data transfer can be performed by the data transfer information INF12, in order of the input data v, w, and u.

In the example illustrated in FIG. 11, the chain operation is specified. However, it is possible to specify different start factors to the data transfer information INF11 and the data transfer information INF12.

According to the present configuration described above, it is possible to transfer plural pieces of data necessary for the filter arithmetic, such as the input data prepared in a RAM etc., or the coefficient data prepared in a ROM, to plural registers of the filter arithmetic unit by one startup. Accordingly, it is possible to enhance the speed of the processing and control operation using the filter arithmetic.

According to the present configuration, even when the storing area of plural pieces of data (coefficient data and input data) is not continuing, data transfer of plural blocks can be continuously performed by one startup by a chain operation. It is also possible to perform data transfer of the output data continuously by one startup. That is, it is possible to select suitably the data transfer mode corresponding to arrangement of data.

According to the present configuration, it is possible to supply necessary data to the filter arithmetic unit before the filter arithmetic. Therefore, it is possible to realize necessary plural kinds of processing and control operations using one DTC and one filter arithmetic unit, without depending on the immediately preceding state of the filter arithmetic unit. In the present configuration, it is possible for the DTC to perform from data write to data read to the filter arithmetic unit as a series of operations, and it is possible to use the filter arithmetic unit exclusively; accordingly it is possible to avoid contention.

According to the present configuration, in addition to the ordinary data transfer function in response to an event, it is possible to perform data transfer in the dual block mode and the shift block mode, which is appropriate for the data transfer to the filter arithmetic unit. It is possible to suppress the increase in the physical scale of the entire microcomputer, by having the format of these kinds of data transfer information in common. Accordingly, it is possible to utilize in common the interruption controller, the DTC vector, etc., leading to the simplification of the hardware configuration.

The data transfer controller explained in the present embodiment is not restricted in application in particular, and it can be used to store data transfer information in a general-purpose storage device, such as a RAM. The data transfer controller described above has the following advantages.

(1) The number of data transfer can be increased. Like the so-called DMA (Direct Memory Access) controller, in the system which has the data transfer information in the exclusive-use hardware of the data transfer controller itself, the number of data transfer is restricted by the implemented hardware. As compared with this, the data transfer controller described above stores data transfer information in a RAM of which the application is not restricted; accordingly, it is easy to increase the number of data transfer, and it is possible to support various kinds of usage demanded by a user.

(2) Ina system like the so-called DMA controller, in which the selection of a start factor is specified by a control register of a data transfer controller itself, or in a system in which the selection of a start factor is implemented as an interface of a microcomputer, it is difficult to respond to many interrupts and events. As compared with this, the data transfer controller described above can select a request of interrupt to the CPU, or a request of data transfer to the DTC, by use of an interrupt factor. Accordingly, it is possible to perform the data transfer in response to the generation of many interrupts and events.

(3) It is possible to increase the number of the data transfer performed at the time of one startup, as in the chain operation. It is also possible to practice many functions by combining different kinds of the data transfer.

(4) It is possible to change the configuration of the data transfer information. It is also possible to increase or decrease the number of data which configures the data transfer information.

(5) It is sufficient that the exclusive-use hardware (DTC and FLT) is just provided with a part necessary for the minimum (single) data transfer. Therefore, even if the function of the MCU is added to increase the hardware scale, it is possible to suppress the increase in the physical scale of the entire MCU.

(6) A control register or the like are not provided as the exclusive-use hardware of the data transfer controller. Therefore, it is not necessary to take into consideration complicated operating conditions, such as conflict with write by the CPU. Therefore, it is possible to contribute to suppressing the increase in the physical scale of the MCU.

Embodiment 2

Figure 12:
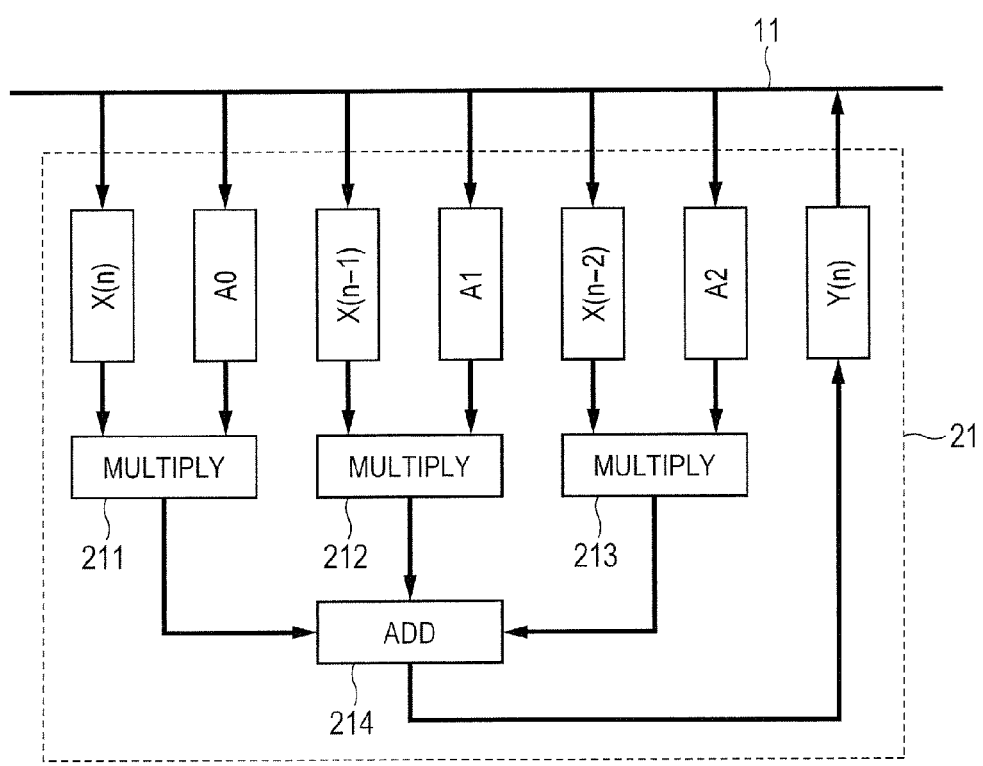
FIG. 12 is a block diagram illustrating schematically a configuration of a filter arithmetic unit (FLT) according to Embodiment 2.

A microcomputer according to Embodiment 2 is explained. In the present embodiment, the concrete example of the FLT 21 of the MCU 100 is explained. FIG. 12 is a block diagram illustrating schematically a configuration of the FLT 21 according to Embodiment 2.

The FLT 21 is an FIR (Finite Impulse Response) filter. The FLT 21 includes three input data registers X(n), and X(n−1), and X(n−2); three coefficient data registers A0, A1, and A2; an output data register Y(n); a multipliers 211-213; and an adder 214.

The input data registers X(n), X(n−1), and X(n−2), the coefficient data registers A0, A1, and A2, and the output data register Y(n) are coupled to the internal bus 11, respectively. Three input data registers X(n), X(n−1), and X(n−2), and the coefficient data registers A0, A1, and A2 are arranged in the continuous addresses in an opposite order, respectively.

The FLT 21 performs operation expressed by Equation (3) with the use of these data.

[Mathematical 3]

$$Y(n)=A0 \cdot X(n)+A1 \cdot X(n-1)+A2 \cdot X(n-2) \qquad (3)$$

In addition, although not restricted in particular, it is assumed that the FLT 21 starts an arithmetic operation, triggered by the write to the input data register X(n). It is also assumed that the arithmetic operation by the FLT 21 is completed in two clocks.

For example, one application is as follows: the state of a motor under the control of the microcomputer is inputted through an A/D converter (included in the analog module 9), and the filter arithmetic by the FLT 21 is performed to this conversion data. In the present application, the data register of the timer 7 is set up by the result of the filter arithmetic, thereby controlling the pulse output of the timer 7.

At this time, the DTC 3 is started by an A/D conversion completion interrupt, and as illustrated in FIG. 11, the DTC 3 transfers the A/D converter conversion data (input data) to the RAM used as the input data block, in the repeat mode. Furthermore, by a chain operation in the shift block mode, the DTC 3 transfers three pieces of data of the input data block to the input data registers X(n−2), X(n−1), and X(n) of the FLT 21, in the order of old data. In this case, what is necessary is to specify the A/D conversion data register as the SAR of the data transfer information, and the input data register X(n−2) as the DAR of the data transfer information.

By the write to the input data register X(n), the operation of the FLT 21 is performed and an arithmetic result is obtained in the output data register Y(n).

Furthermore, the DTC 3 reads the output data register Y(n) by the chain operation. Then, the DTC 3 can write the read data to the prescribed data register of the timer. As a result, a necessary pulse or waveform output can be obtained.

In the present case, between the write to the input data register X(n) and the write to the output data register Y(n), there exist the write of the data transfer information (state IW) and the read of the data transfer information (state IR). Therefore, the period required for the operation of the FLT 21 can be secured.

Figure 13:
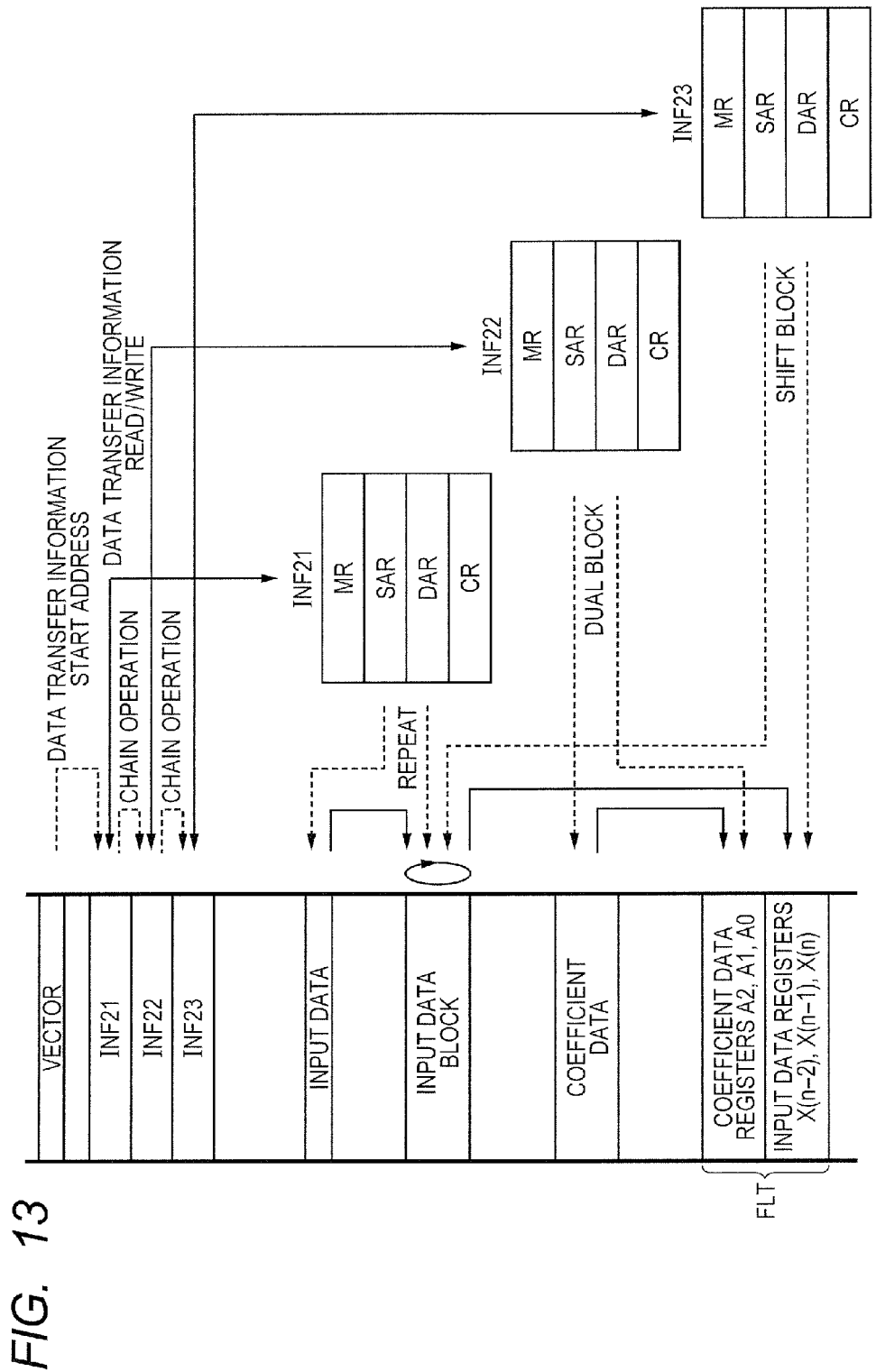
FIG. 13 is a drawing illustrating an example of use of the filter arithmetic unit (FLT) according to Embodiment 2.

Next, the example of use of the FLT 21 is explained. FIG. 13 illustrates an example of use of the FLT 21 according to Embodiment 2. It is assumed that the FLT 21 is used at different timing to several kinds of control, with the use of different coefficient data. Therefore, for example, the DTC 3 transfers the coefficient data prepared in the ROM 4 to the coefficient data registers A0, A1, and A2 of the FLT 21 (dual block mode). This data transfer is performed by means of the data transfer information INF22.

It is assumed that the data transfer from the input data block to the input data registers X(n−2), X(n−1), and X(n) (data transfer in the shift block mode in FIG. 11) is performed by means of the data transfer information INF23.

After the data transfer by means of the data transfer information INF21, the data transfer information INF22 is read (state IR) by the chain operation. After the data transfer by means of the data transfer information INF22, the data transfer information INF23 is read (state IR) by the chain operation.

In the data transfer information INF22, the TMD2-TMD0 bits of the MR are "101" (dual block mode). In the present conditions, the DTC 3 performs data transfer for the block size specified by the TCRL, from the address of the coefficient data specified by the SAR to the address of the coefficient data registers A2, A1, and A0 of the FLT 21 specified by the DAR, while decrementing the TCRH (state SR, state DW).

When the TCRH is decreased to 0, the DTC 3 returns the data of the DAR and the TCRH to the respective initial setting values (state OP). Subsequently, the DTC 3 writes the information updated among the data transfer information, the CR to be more precise, to the original address (state IW).

Subsequently, the DTC 3 performs the data transfer by means of the data transfer information INF23 by the chain operation. The FLT 21 starts the above-described filter arithmetic operation triggered by the write to the input data register X(n). Although not shown, the DTC 3 reads subsequently the output data register Y(n) by the chain operation. Then, the DTC 3 writes the read data to the prescribed data register of the timer.

According to the present configuration described above, it is possible to perform arithmetic for plural pieces of the input data by the FIR filter.

Embodiment 3

Figure 14:
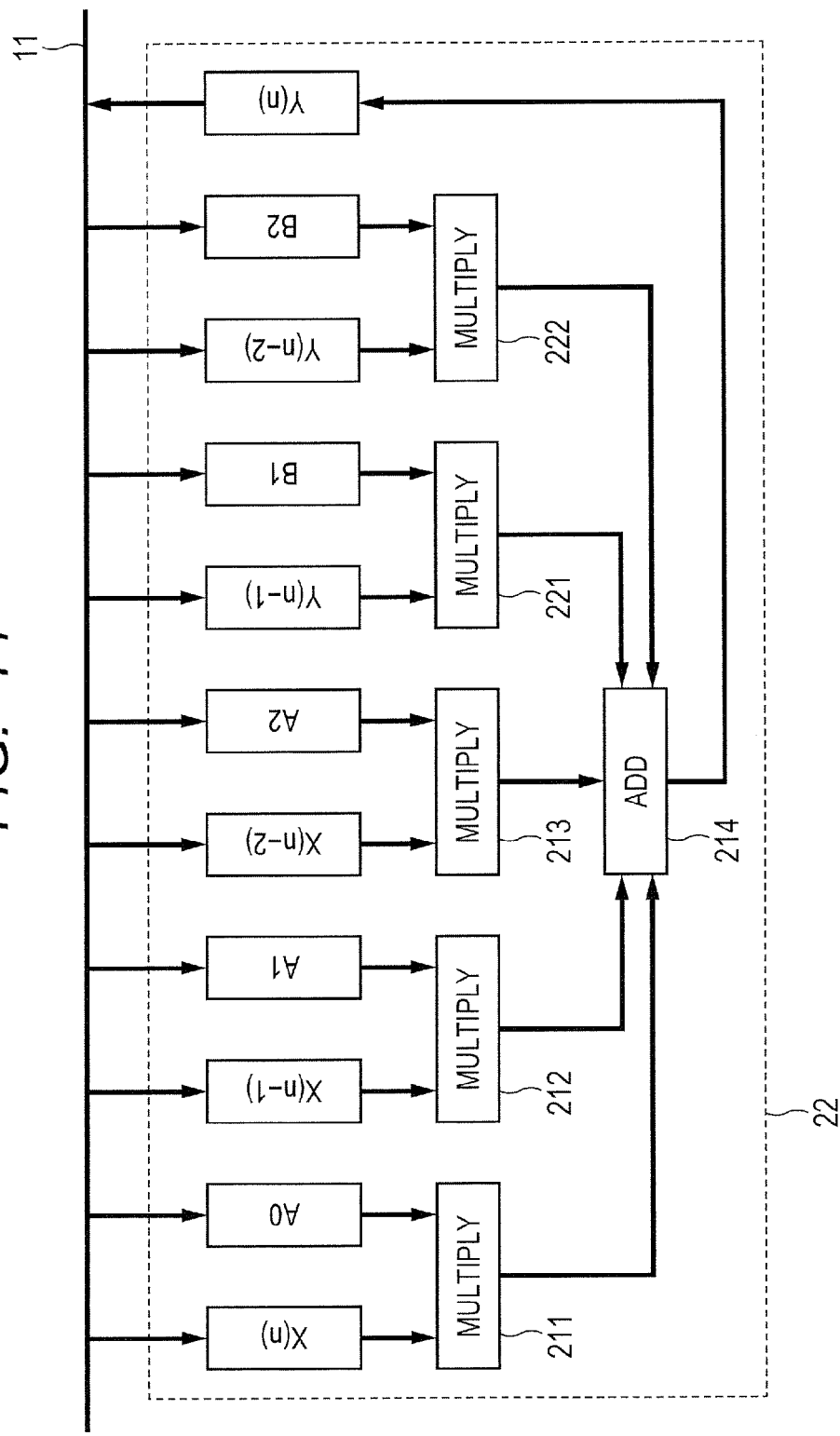
FIG. 14 is a block diagram illustrating schematically a configuration of a filter arithmetic unit (FLT) according to Embodiment 3.

A microcomputer according to Embodiment 3 is explained. In the present embodiment, a modified example of the FLT 21 of the MCU 100 is explained. FIG. 14 is a block diagram illustrating schematically a configuration of an FLT 22 according to Embodiment 3.

The FLT 22 is an IIR (Infinite Impulse Response) filter. The FLT 22 includes five input data registers X(n), X(n−1), X(n−2), Y(n−1), and Y(n−2), five coefficient data registers A0, A1, A2, B1, and B2, an output data register Y(n), multipliers 211, 212, 213, 221, and 222, and an adder 214. That is, the FLT 22 is equivalent, in configuration, to the FLT 21 to which the output data registers Y(n−1) and Y(n−2), the coefficient data registers B1 and B2, and the multipliers 221 and 222 are added.

The input data registers X(n), X(n−1), X(n−2), Y(n−1), and Y(n−2), the coefficient data registers A0, A1, A2, B1, and B2, and the output data register Y(n) are coupled to the internal bus 11, respectively. The input data registers X(n), X(n−1), X(n−2), Y(n−1), and Y(n−2), the coefficient data registers A0, A1, A2, B1, and B2, and the output data register Y(n) are arranged in the continuous addresses respectively, in the opposite order.

The FLT 22 performs operation expressed by Equation (4) with the use of these data.

[Mathematical 4]

$$Y(n) = A0 \cdot X(n) + A1 \cdot X(n-1) + A2 \cdot X(n-2) + B1 \cdot Y(n-1) + B2 \cdot Y(n-2) \quad (4)$$

When the coefficient data B1 and B2 are set to 0, the FLT 22 becomes equivalent to the FLT 21 as the FIR filter. The degree or the number of delay data to be used can be changed by the setup of the coefficient data. The arithmetic operation unit (FLT) is employed in common in several kinds of control, by means of one piece of hardware. Therefore, even if the degree is increased and the hardware configuration is enlarged, it is possible to suppress the influence on the physical scale of the microcomputer.

Figure 15:
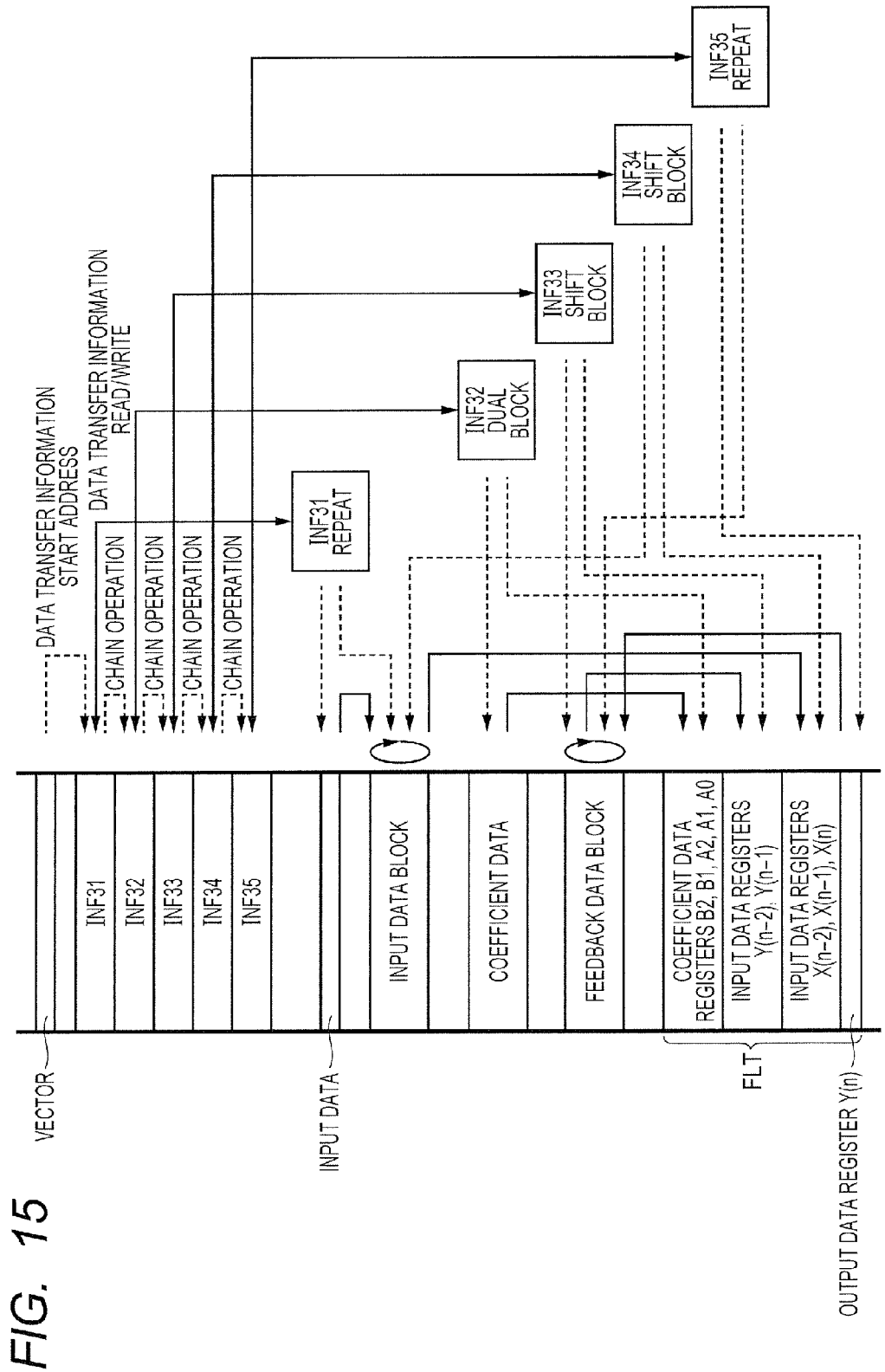
FIG. 15 is a drawing illustrating an example of use of the filter arithmetic unit (FLT) according to Embodiment 3.

Next, the example of use of the FLT 22 is explained. FIG. 15 illustrates an example of use of the FLT 22 according to Embodiment 3. The DTC 3 transfers the coefficient data prepared in the ROM 4 to the coefficient data registers A0, A1, A2, B1, and B2 of the FLT 22 by means of the data transfer information INF32. The transfer mode at this time is the dual block mode, and the block size is 5. The data transfer concerning the data transfer information INF31 and INF32 is the same as the data transfer concerning the data transfer information INF21 and INF22 in Embodiment 2.

The DTC 3 transfers the delay data (feedback data block) secured in the RAM 5 for example, to the output data registers Y(n−1) and Y(n−2) of the FLT 22 by means of the data transfer information INF33. The transfer mode at this time is the shift block mode, and the block size is 2.

The DTC 3 performs the data transfer from the input data block to the input data registers X(n−2), X(n−1), and X(n) by means of the data transfer information INF34. Accordingly, the FLT 22 starts the filter arithmetic operation.

The DTC 3 performs the data transfer of the output data register Y(n) to the feedback data block by means of the data transfer information INF35. The transfer mode at this time is the repeat mode, and the repeat size is 2.

Although not Shown, the DTC 3 reads the output data register Y(n), and writes the read data to the prescribed data register of the timer, by the chain operation.

According to the present configuration described above, it is possible to employ the delay data by means of the output data of the FLT in the past for the filter arithmetic in the FLT. Accordingly, more complicated filter arithmetic becomes possible, resulting in the realization of the IIR filter, for example.

Embodiment 4

Figure 16:
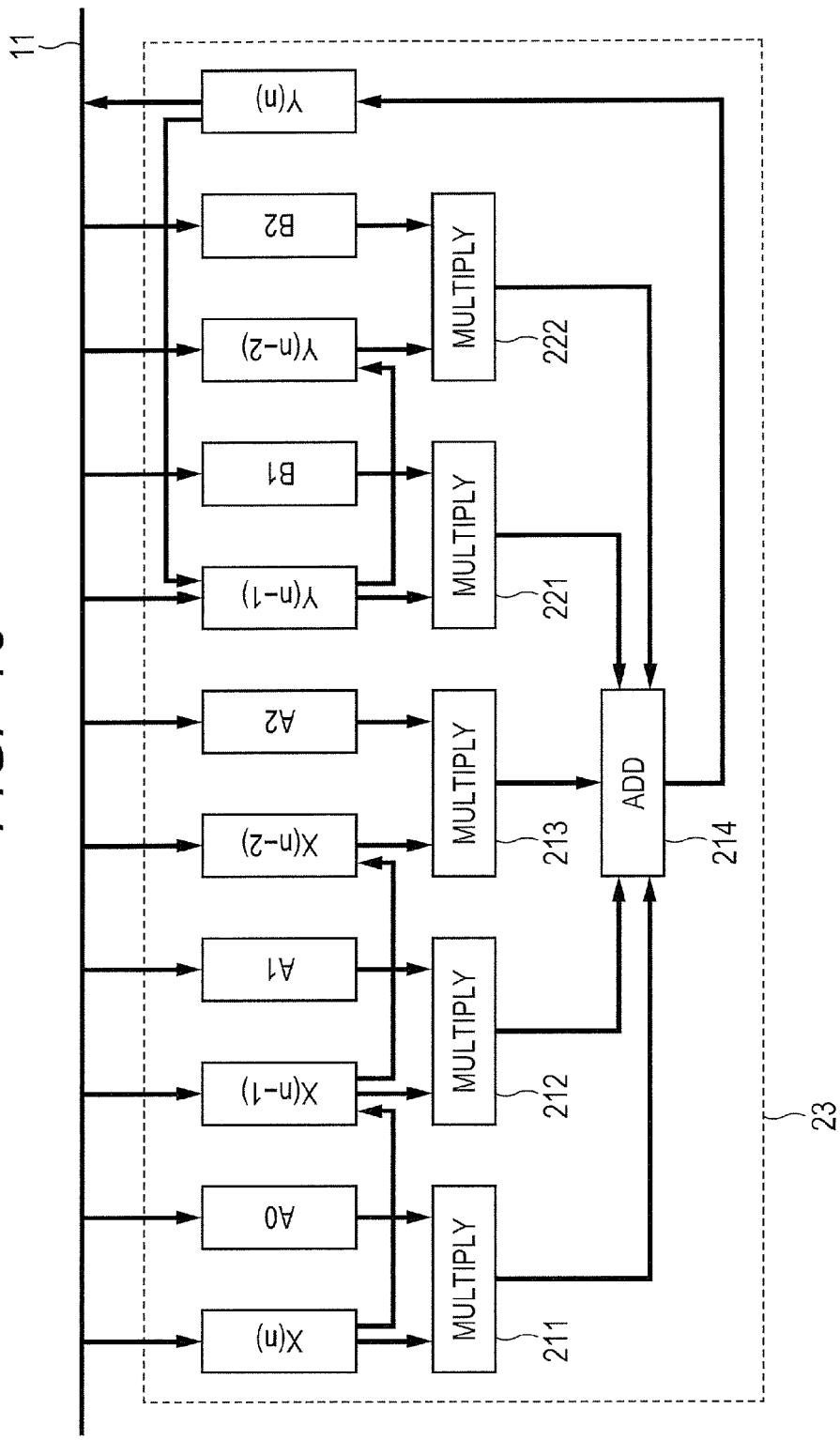
FIG. 16 is a block diagram illustrating schematically a configuration of a filter arithmetic unit (FLT) according to Embodiment 4.

A microcomputer according to Embodiment 4 is explained. In the present embodiment, a modified example of the FLT 22 is explained. FIG. 16 is a block diagram illustrating schematically a configuration of an FLT 23 according to Embodiment 4.

Hereinafter, the difference of the configuration between the FLT 22 and the FLT 23 is explained. In the FLT 23, at the completion time of the filter arithmetic operation, the data transfer is performed from the input data registers X(n) to X(n−1), from X(n−1) to X(n−2), from Y(n−1) to Y(n−2), and from Y(n) to Y(n−1). The output data registers Y(n−2), Y(n−1), X(n−2), X(n−1), and X(n) are arranged in the continuous addresses.

Figure 17:
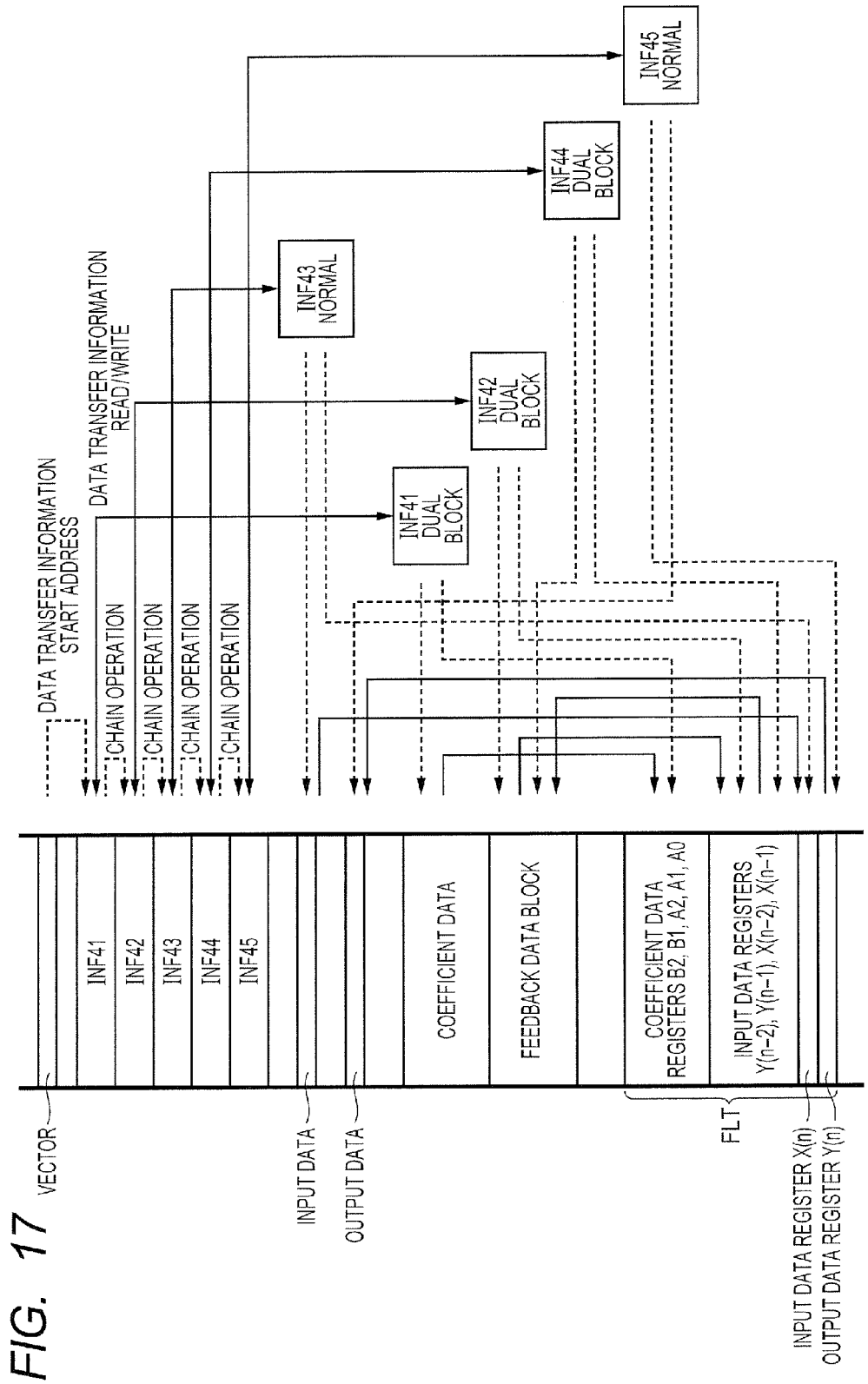
FIG. 17 is a drawing illustrating an example of use of the filter arithmetic unit (FLT) according to Embodiment 4.

Next, the example of use of the FLT 23 is explained. FIG. 17 illustrates an example of use of the FLT 23 according to Embodiment 4. The DTC 3 secures data necessary for next time in the feedback area after the filter arithmetic. The input data can be transferred directly. The data transfer concerning the data transfer information INF41 and INF42 is the same as the data transfer concerning the data transfer information INF21 and INF22 in Embodiment 2.

The DTC 3 transfers the coefficient data prepared in the ROM 4 to the coefficient data registers A0, A1, A2, B1, and B2 of the FLT 23 by means of the data transfer information INF41. The transfer mode at this time is the dual block mode, and the block size is 5.

The DTC3 transfers the data of the feedback data block secured in the RAM 5 for example, to the input data registers X(n−1), X(n−2), Y(n−1), and Y(n−2) of the FLT 23, by means of the data transfer information INF42. The transfer mode at this time is the dual block mode, and the block size is 4.

The DTC 3 transfers the A/D converter conversion data (input data) to the input data register X(n) of the FLT 23 by means of the data transfer information INF43. The transfer mode at this time is the normal mode. Accordingly, the FLT 23 starts the filter arithmetic operation. At the time of completion of the filter arithmetic operation, the data transfer is performed in the FLT 23 from the input data registers X(n) to X(n−1), from X(n−1) to X(n−2), from Y(n−1) to Y(n−2), and from Y(n) to Y(n−1). Accordingly, the delay data for the next filter arithmetic can be obtained.

The DTC 3 transfers the data of the input data registers X(n−2), X(n−1), Y(n−1), and Y(n−2) to the feedback data block by means of the data transfer information INF44. The transfer mode at this time is the dual block mode, and the block size is 4.

The DTC 3 reads the output data register Y(n) and writes the read data to the prescribed data register of the timer, by means of the data transfer information INF45. The transfer mode at this time is the normal mode.

When the coefficient data is arranged in the address continuing to the feedback data block, the data transfer by means of the data transfer information INF41 and INF42 can be performed by one data transfer in the dual block mode.

If necessary, it is possible to provide an arithmetic completion interrupt of the FLT 23, and to start the DTC 3 by the interrupt. However, when the FLT 23 is employed for plural kinds of control, it becomes necessary to judge which operation of the control has been completed. When the start factor is decided, it is decided as well which control is performed. Therefore, it is desirable to perform continuously up to the transfer of the output data by the chain operation, as in the present embodiment. When the FLT 23 is used for plural control applications, it is possible to leave the avoidance of conflict to the DTC 3.

According to the present configuration described above, it is possible to employ the delay data by means of the output data of the FLT in the past, for the filter arithmetic in the FLT. Accordingly, more complicated filter arithmetic becomes possible, resulting in the realization of the IIR filter, for example. The delay data can be transferred inside the FLT. Therefore, it is possible to reduce the number of data to be transferred between the DTC and the FLT. Accordingly, it is possible to realize the speed enhancement of the processing by the MCU.

Embodiment 5

Figure 18:
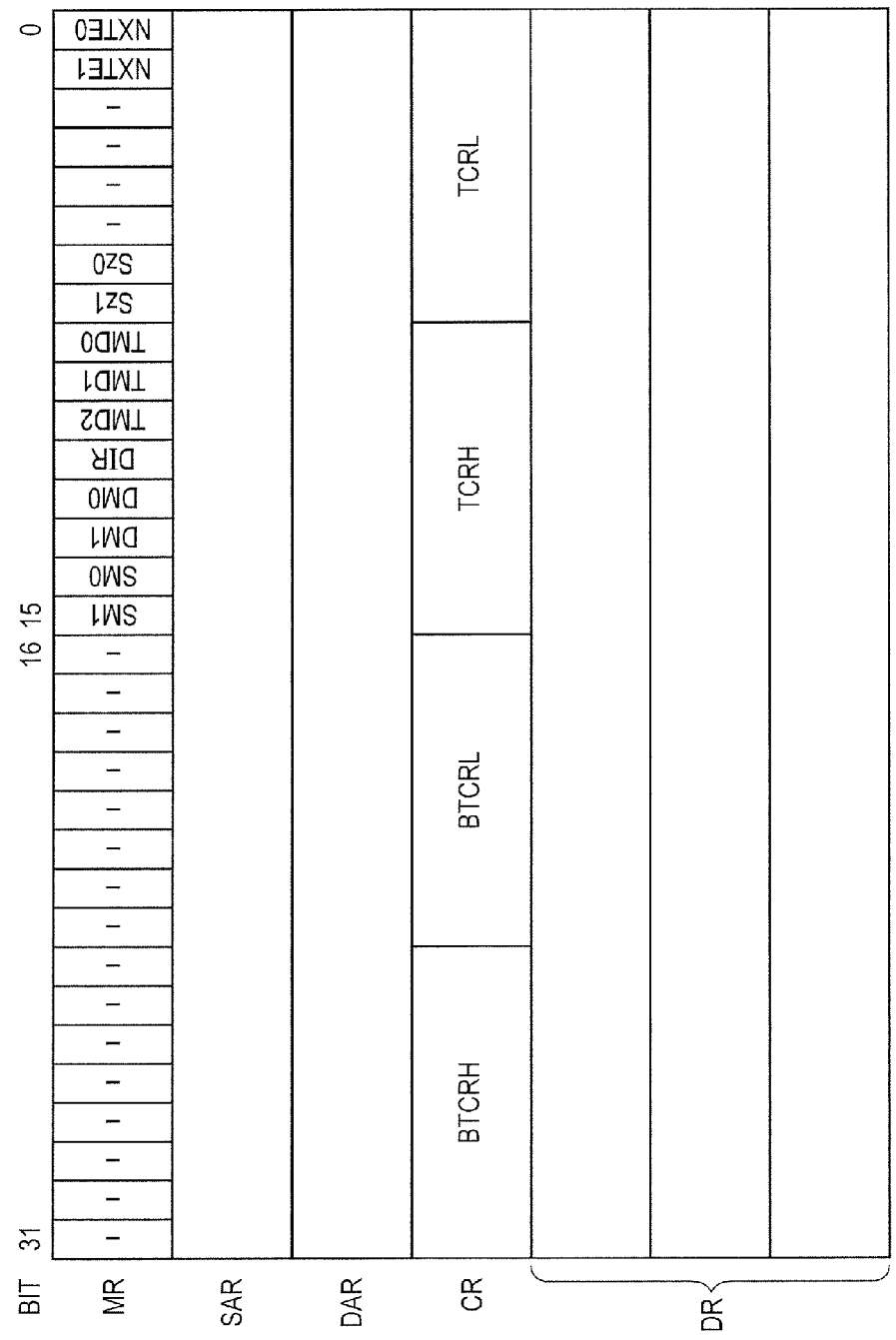
FIG. 18 is a drawing illustrating schematically a configuration of data transfer information according to Embodiment 5.

A microcomputer according to Embodiment 5 is explained. In the present embodiment, a modified example of the data transfer information is explained. FIG. 18 illustrates schematically a configuration of data transfer information according to Embodiment 5.

In the present embodiment, it is assumed that when the TMD2-TMD0 bits are "111", the transfer mode is the block buffer mode. In the present embodiment, a data register (also called DR) is added to the data transfer information as compared with Embodiment 1. The data size of the DR is specified by the Sz1 bit and the Sz0 bit. The number of the DR is specified by the TCRH and the TCRL. As described later, one address register is sufficient in the block buffer mode. Therefore, the present example is explained assuming that the SAR is not used.

Figure 19:
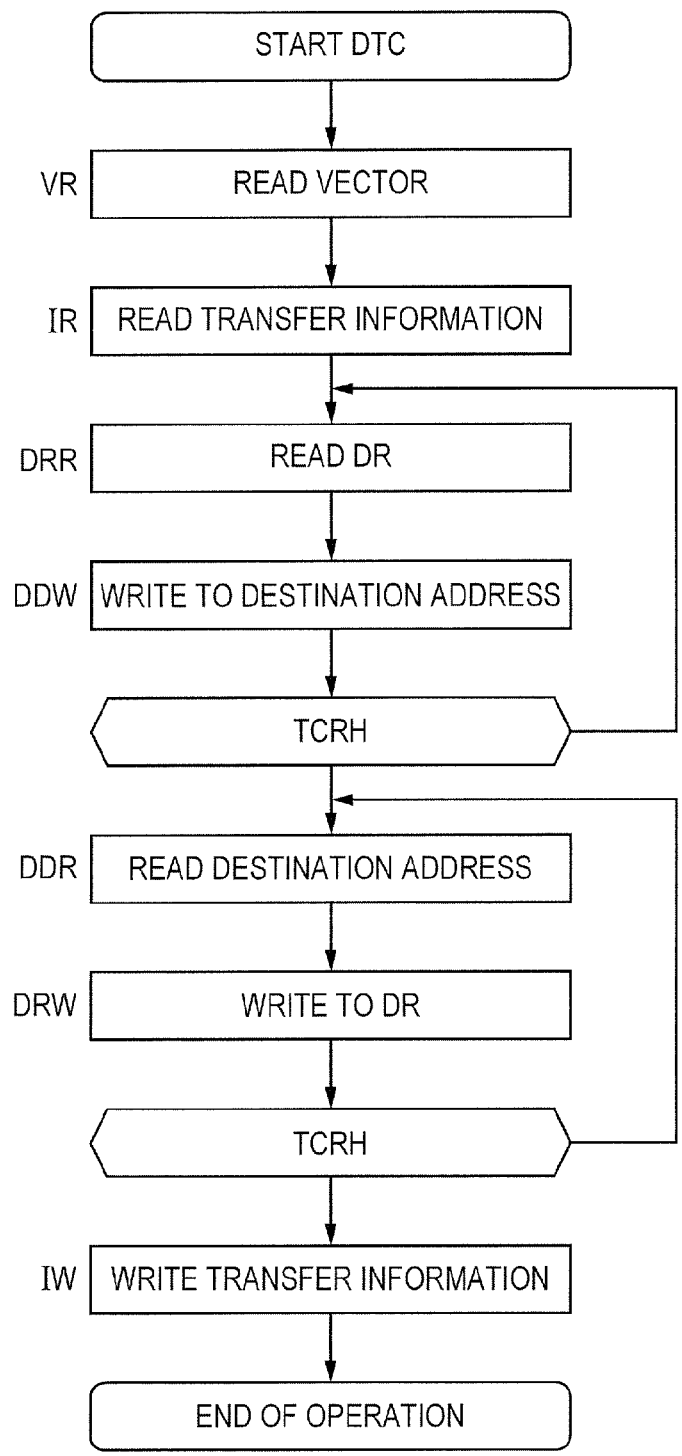
FIG. 19 is a drawing illustrating an operation of the data transfer controller (DTC) in a block buffer mode.

Next, an operation of the DTC 3 in the block buffer mode is explained. FIG. 19 illustrates the operation of the DTC 3 in the block buffer mode. The CPU 1 writes the necessary data transfer information to a prescribed transfer information address area. The CPU 1 sets to 1 the DTE bit corresponding to the interrupt factor to be rendered as a start factor. When an interrupt occurs and the DTC 3 is started in this state, a start request signal DTCREQ and a vector number DTCVEC are supplied from the INT 2 to the DTC 3.

The DTC 3 reads a vector area corresponding to the vector number DTCVEC (state VR). The DTC 3 stores in the VAR 34 the start address of the data transfer information which is the read data, and increments the start address of the data transfer information. Then, the DTC 3 reads the MR, the DAR, and the CR (state IR), and stores the data transfer information read in a register file of the DTC 3.

The DTC 3 reads the DR according to the VAR 34 (state DRR), and writes the read data to the destination address specified by the DAR (state DDW). Then, the DTC 3 decrements the TCRH. This operation is repeated for the number of counts specified by the TCRH and the TCRL. When the TCRH is decreased to 0, the DTC 3 copies the data of the TCRL to the TCRH.

The DTC 3 reads the destination address specified by the DAR (state DDR), and writes the read data to the DR according to the VAR 34 (state DRW). The DAR decrements the VAR 34 in an opposite direction to the specification of the DM1 bit and the DM0 bit. This operation is repeated for the number of counts specified by TCRH and TCRL. When the TCRH is decreased to 0, the DTC 3 copies the data of the TCRL to the TCRH.

The DTC 3 writes the information updated among the data transfer information to the original address (state IW).

When the chain operation is specified, based on the VAR 34, the next data transfer information is read (IR) and the next data transfer is performed.

When the TCRH is decreased to 0 in the above, the DAR and the VAR 34 may be returned to the start address by the same operation as the block transfer mode, and in the state DDR and the state DRW, the DAR may be incremented or decremented and the VAR 34 may be incremented, according to the specification of the DM1 bit and the DM0 bit.

As for the state transition of the DTC 3, the state DRR, the state DDW, the state DDR, and the state DRW are added. The state DDW can be used as the state DW.

Figure 20:
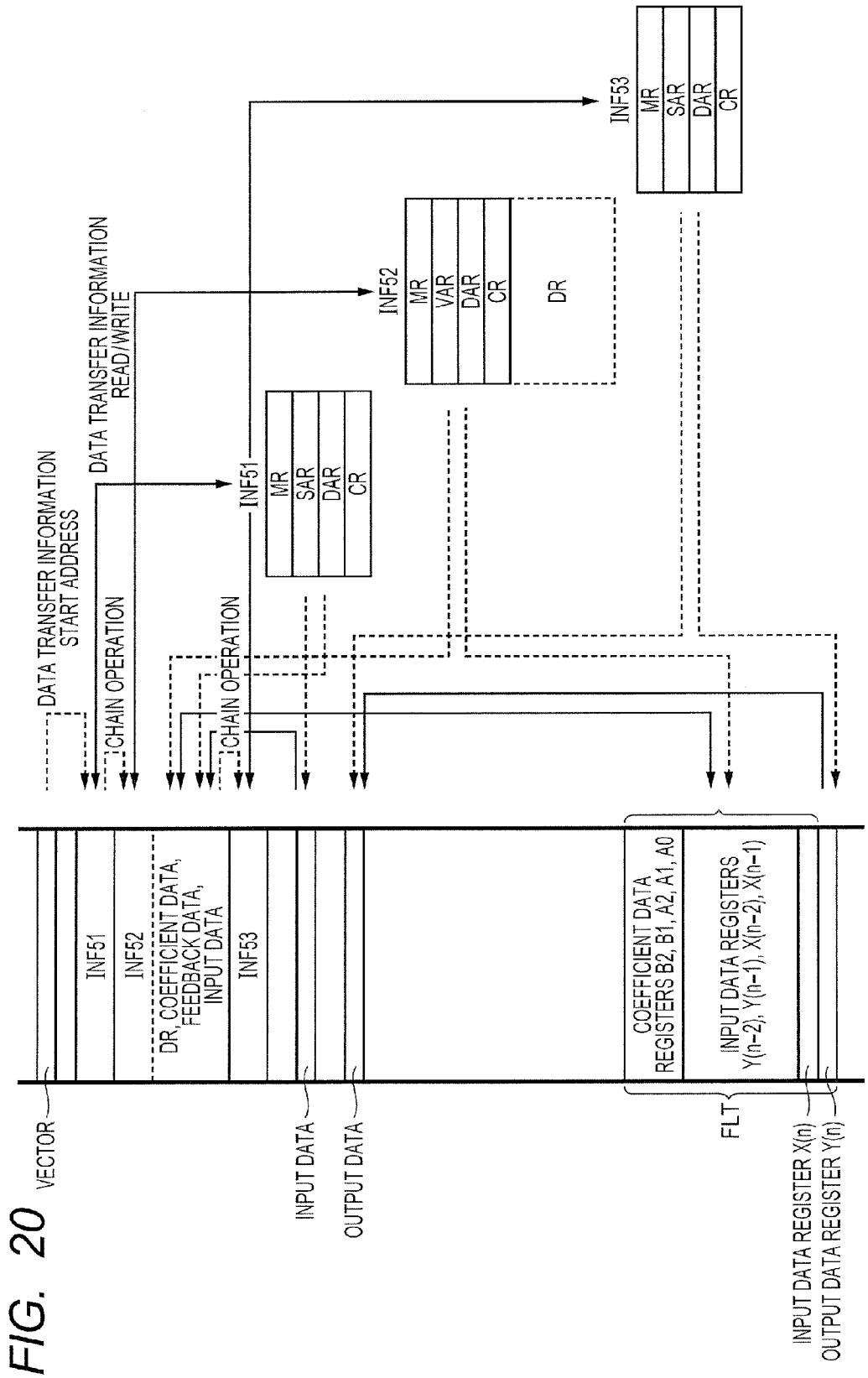
FIG. 20 is a drawing illustrating an example of use of the filter arithmetic unit (FLT) in a block buffer mode.

Next, the example of use of the FLT 23 in Embodiment 5 is explained. FIG. 20 illustrates an example of use of the FLT 23 in the block buffer mode.

In the present example, the coefficient data (B2, B1, A2, A1, and A0), the feedback data (Y(n−2), Y(n−1), X(n−2), and X(n−1)), and the input data (X(n)) are secured in the DR of the data transfer information INF52.

The DTC 3 transfers the A/D converter conversion data (input data) to the address corresponding to the input data (X(n)) of the DR of the data transfer information INF52 arranged in the RAM 5, etc., by means of the data transfer information INF51. The transfer mode at this time is the normal mode.

The DTC 3 transfers the data of the RAM 5 held as the DR to the coefficient data registers (B2, B1, A2, A1, and A0) and the input data registers (Y(n−2), Y(n−1), X(n−2), X(n−1), and X(n)) of the FLT 23, by means of the data transfer information INF52. The transfer mode at this time is the buffer mode, and the block size is 10. The FLT 23 starts the filter arithmetic operation triggered by the write to the input data register X(n).

The DTC 3 transfers the data of the coefficient data registers (B2, B1, A2, A1, and A0) and the input data registers (Y(n−2), Y(n−1), X(n−2), X(n−1), and X(n)) of the FLT 23 after the operation, to the RAM 5 used as the DR, by means of the data transfer information INF52.

The DTC 3 reads the output data register Y(n) and writes the read data to the prescribed data register of the timer, by means of the data transfer information INF53. The transfer mode at this time is the normal mode.

In the present example, the DR is arranged in the RAM 5, etc., accordingly, it is possible to perform initial setting by the CPU, etc.

As described above, in the present embodiment, it is possible to perform two data transfers in the opposite directions as one set of data transfer, by the data transfer in the block buffer mode. As a result, it is possible to perform the data transfer for the data setting to the filter arithmetic unit and the data transfer for holding the arithmetic result such as delay data, by small amount of the data transfer information. Accordingly, it is possible to save the area of the RAM holding the data transfer information. It is also possible to enhance the speed of the data transfer by reducing the number of counts of the read/write of the data transfer information.

Embodiment 6

Figure 21:
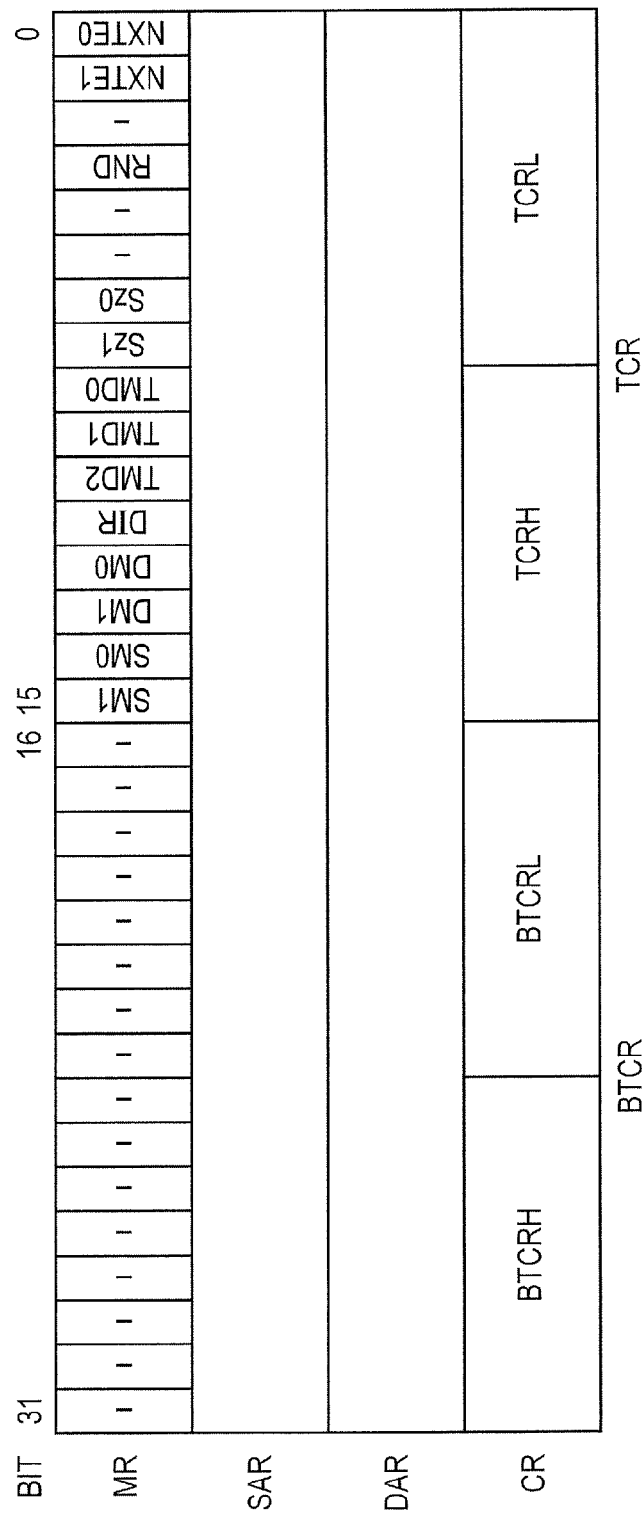
FIG. 21 is a drawing illustrating schematically a configuration of data transfer information according to Embodiment 6.

A microcomputer according to Embodiment 6 is explained. In the present embodiment, a modified example of the data transfer information is explained. FIG. 21 illustrates schematically a configuration of data transfer information according to Embodiment 6.

In the present embodiment, an RND bit is provided in bit 3 of the MR. When the RND bit is set to 1, the data transfer is performed from a source address to a destination address, and then the data transfer is performed from the destination address to the source address. This operation is called a round operation. The round operation can be used in combination with the normal mode and the dual block mode.

Figure 22:
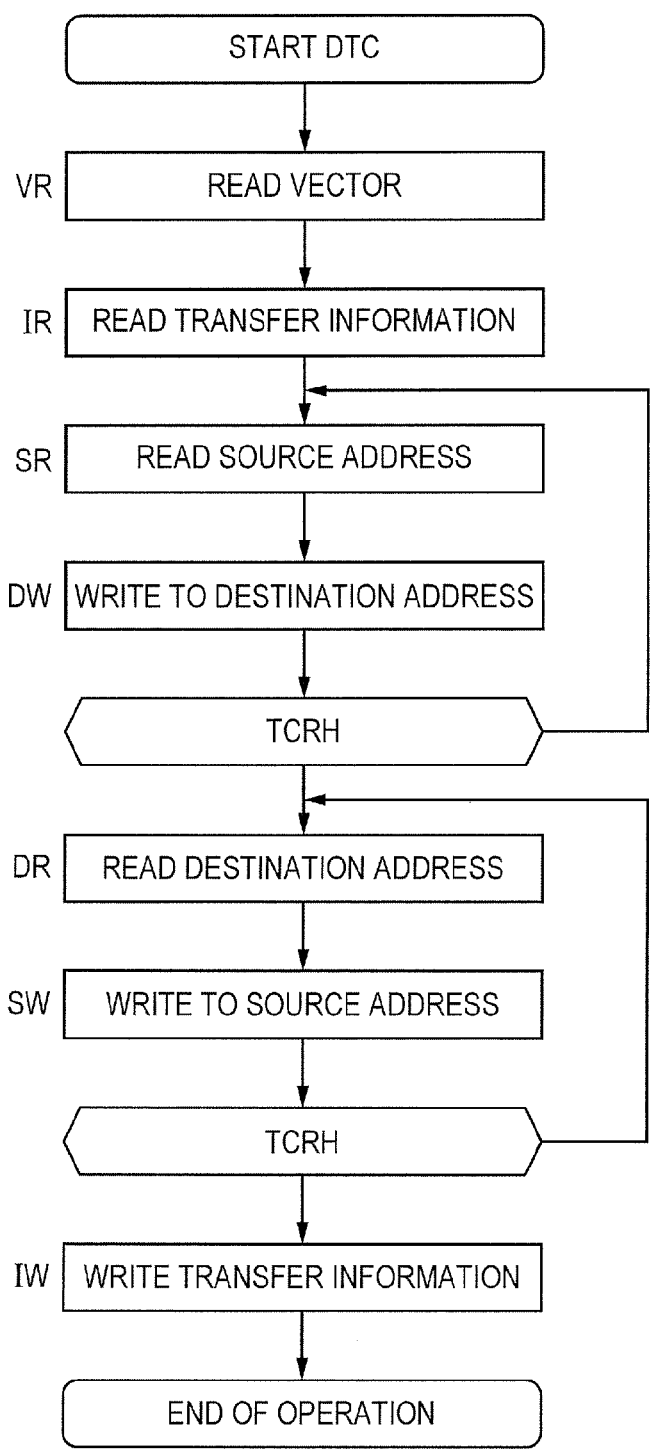
FIG. 22 is a drawing illustrating a round operation of the data transfer controller (DTC) in a dual block mode.

Next, the round operation of the dual block mode is explained. FIG. 22 illustrates the round operation of the DTC 3 in the dual block mode. The DTC 3 reads the vector area corresponding to the vector number DTCVEC (state VR) The DTC 3 reads the data transfer information according to the read data (state IR). The DTC 3 stores the data transfer information read to the register file of the DTC 3.

The DTC 3 reads the source address specified by the SAR (state SR), and writes this to the destination address specified by the DAR (state DW). This operation is repeated for the number of counts specified by the TCRH and the TCRL. When the TCRH is decreased to 0, the DTC 3 returns the SAR and the DAR to the start address, and copies the data of the TCRL to the TCRH.

The DTC 3 reads the destination address specified by the DAR (state DR), and writes this to the source address specified by the SAR (state SW). This operation is repeated for the number of counts specified by the TCRH and the TCRL. When the TCRH is decreased to 0, the DTC 3 returns the SAR and the DAR to the start address, and copies the data of the TCRL to the TCRH.

The DTC 3 writes the information updated among the data transfer information to the original address (state IW).

When the chain operation is specified, based on the VAR 34, the next data transfer information is read (state IR) and the next data transfer is performed.

In the state SR and the state DW, when the TCRH is decreased to 0, the DTC 3 may not return the SAR and the DAR to the start address, but may increment or decrement the SAR in the opposite direction to the specification of the SM1 bit and the SM0 bit, and may increment or decrement the DAR in the opposite direction to the specification of the DM1 bit and the DM0 bit.

The state transition of the DTC 3 is extended so that the state DR and the state SW are added.

Figure 23:
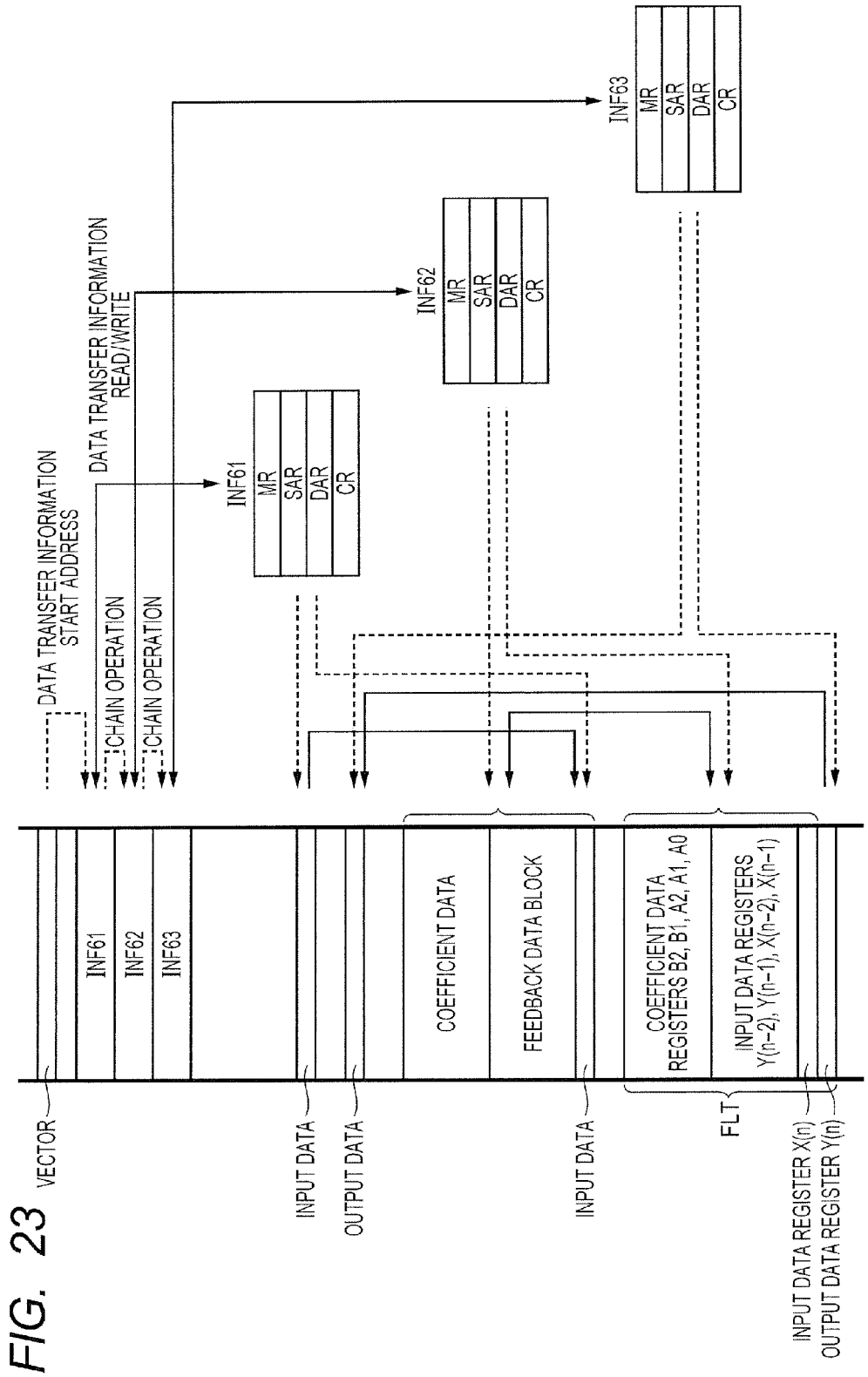
FIG. 23 is a drawing illustrating an example of use of the filter arithmetic unit (FLT) in employing the round operation of the dual block mode.

Next, the example of use of the FLT 23 in Embodiment 6 is explained. FIG. 23 illustrates an example of use of the FLT 23 in employing the round operation of the dual block mode.

The DTC 3 provides an area holding the coefficient data (B2, B1, A2, A1, and A0), the feedback data (Y(n−2), Y(n−1), X(n−2), and X(n−1)), and the input data (X(n)) in the continuous addresses in the RAM 5.

The DTC 3 transfers the A/D converter conversion data (input data) to the input data area in the RAM 5 by means of the data transfer information INF61. The transfer mode at this time is the normal mode.

The DTC 3 transfers the data of the areas in the RAM 5 holding the coefficient data, the feedback data, and the input data, to the coefficient data registers (B2, B1, A2, A1, and A0) and the input data registers (Y(n−2), Y(n−1), X(n−2), X(n−1), and X(n)) of the FLT 23, by means of the data transfer information INF62. The transfer mode at this time is the dual block mode, and the round operation is employed. The block size at this time is 10. The FLT 23 starts the filter arithmetic operation triggered by the write to the input data register X(n).

The DTC 3 transfers the data of the coefficient data registers (B2, B1, A2, A1, and A0) and the input data registers (Y(n−2), Y(n−1), X(n−2), X(n−1), and X(n)) of the FLT 23 after the operation, to the areas holding the coefficient data, the feedback data, and the input data in the RAM 5, by means of the data transfer information INF 62.

The DTC 3 reads the output data register Y(n) and writes the read data to the prescribed data register of the timer, by means of the data transfer information INF63. The transfer mode at this time is the normal mode.

As described above, in the present embodiment, it is possible to perform two data transfers in the opposite directions as one set of data transfer, by performing the round operation. As a result, it is possible to perform the data transfer for the data setting to the filter arithmetic unit and the data transfer for holding the arithmetic result such as delay data, by small amount of the data transfer information. Accordingly, it is possible to save the area of the RAM holding the data transfer information. It is also possible to enhance the speed of the data transfer by reducing the number of counts of the read/write of the data transfer information.

Embodiment 7

Figure 24:
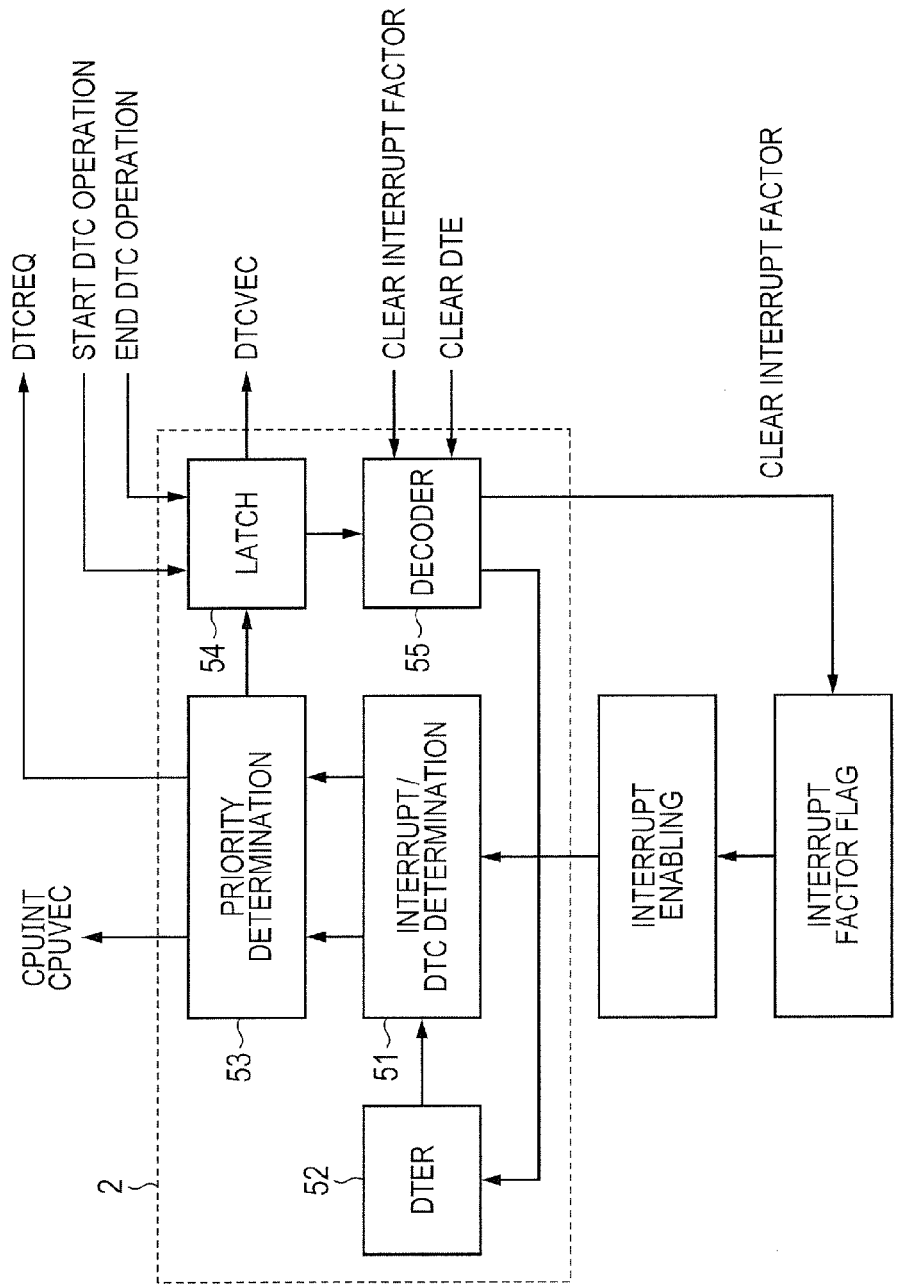
FIG. 24 is a block diagram illustrating an interrupt controller (INT)

A microcomputer according to Embodiment 7 is explained. In the present embodiment, the concrete example of the INT 2 of the MCU 100 is explained. FIG. 24 is a block diagram illustrating the interrupt controller (INT) 2.

The INT 2 includes an interrupt/DTC determination circuit 51, a DTC enabling register (also called DTER) 52, a priority determination circuit 53, a latch circuit 54, and a decoder circuit 55.

There are two kinds of interrupt factors of the MCU 100, an internal interrupt and an external interrupt, provided with respective interrupt factor flags. The interrupt factor flag is set to "1" when the functional blocks of the timer 7, the communication module 8, and the analog module 9 change into a prescribed state. For example, the external interrupt factor flag is set to "1", when the external interrupt input terminal changes to a prescribed level, or when a prescribed signal change occurs. An interrupt factor flag is cleared to 0 by the write operation of the CPU 1 and also by the completion of the data transfer by the DTC 3.

The output of each bit of the interrupt factor flag is inputted into the interrupt enable circuit. Furthermore, the data of the interrupt enable register, that is, an interrupt enable bit, is inputted into this interrupt enable circuit. The interrupt enable register is a register to which the CPU 1 can perform read/write and selects whether to enable or disenable the corresponding interrupt.

When the interrupt factor flag is set to "1" and the interrupt enable bit is set to "1", an interrupt is requested. The output (the interrupt request) of the interrupt enable circuit is inputted into the interrupt/DTC determination circuit 51.

The data of the DTC enabling register (also called DTER) 52 is inputted into the interrupt/DTC determination circuit 51. When an interrupt is requested, the interrupt/DTC determination circuit 51 selects whether to start the DTC 3 or to enable an interrupt to the CPU 1.

When the bit corresponding to the interrupt factor of the DTC enabling register 52 is set to "1", the interrupt/DTC determination circuit 51 requests startup of the DTC 3, and does not request the interrupt to the CPU 1. When the bit corresponding to the interrupt factor of the DTC enabling register 52 is cleared to "0", the interrupt/DTC determination circuit 51 requests the interrupt to the CPU 1, and does not request the startup of the DTC 3. The interrupt/DTC determination circuit 51 outputs a start request to the priority determination circuit 53.

The priority determination circuit 53 determines priority, when plural interrupt requests have occurred to each of the interrupt request to the CPU 1 and the start request of the DTC 3. When performing the priority determination of the start request of the CPU 1, it is possible to concurrently perform the determination of a mask level. The priority determination of the start request of the CPU 1 is controlled according to the priority register, an interrupt mask level, etc.

The priority determination circuit 53 selects a start request which has the highest priority, and generates a vector number. When the start request of the CPU 1 is selected, the priority determination circuit 53 generates an interrupt request CPUINT and a vector number CPUVEC of the CPU 1. When the start request of the DTC 3 is selected, the priority determination circuit 53 generates a start request signal DTCREQ and the vector number DTCVEC of the DTC 3. The start request signal DTCREQ is inputted to the DTC 3. The vector number DTCVEC is inputted to the latch circuit 54.

A DTC operation start signal and a DTC operation end signal are inputted into the latch circuit 54 from the DTC 3. That is, when the DTC 3 starts operation, a DTC operation signal becomes in an active state, and the latch circuit 54 latches or holds the vector number DTCVEC. When the data transfer of the DTC 3 is completed and the DTC operation end signal becomes in an active state, the latch by the latch circuit 54 is canceled.

The vector number DTCVEC and the DTC operation end signal are inputted to the decoder circuit 55. Accordingly, a factor clear signal to the corresponding interrupt factor flag becomes in an active state, and the corresponding interrupt factor flag or the DTE bit is cleared.

When the DTC 3 is started by a necessary interrupt factor, the CPU 1 writes the data transfer information, etc. to a necessary address in advance, sets to "1" the interrupt enable bit corresponding to the interrupt factor concerned, and sets to "1" the DTE bit corresponding to the interrupt factor concerned of the DTC enabling register 52.

When the interrupt factor flag concerned is set to "1", the DTC 3 is started. In the state where the DTC 3 is performing the prescribed data transfer, the DTC 3 clears the interrupt factor flag concerned to "0" for every data transfer. At this time, the interrupt to the CPU 1 is not requested.

When the prescribed data transfer is completed, the DTC 3 clears the DTE bit to "0." At this time, the interrupt factor flag concerned is held at "1" and the DTE bit is cleared to "0." Therefore, the interrupt to the CPU 1 is requested. The CPU 1 performs processing corresponding to the completion of the prescribed data transfer, and resets the data transfer information and the DTE bit.

Embodiment 8

A microcomputer according to Embodiment 8 is explained. In the present embodiment, the explanation is made for an example of applying the above-described MCU to a camera system to control a camera. FIG. 25 is a block diagram illustrating a camera system 1000 including the MCU.

The camera system 1000 includes a camera body MCU 1001, a camera lens MCU 1002, a vibration-preventing motor 1003, and a sensor 1004 which measures the velocity and angular velocity of the lens. One of the MCUs explained in Embodiments 1-7 is employed for the camera lens MCU 1002. The camera lens MCU 1002 performs the control of necessary control targets, the control of the vibration-preventing motor, and the control of a focus motor and an aperture diaphragm motor (not shown).

The camera lens MCU 1002 includes a vibration-preventing motor timer S (also called TS), a focus motor timer F (also called TF), a diaphragm motor timer D (also called TD), and a timer I with an interval timer function (also called TI). The timer S, the timer F, the timer D, and the timer I correspond to the timer 7, respectively. The output of a vibration prevention-specific sensor is inputted into an A/D converter ADC. The A/D converter ADC corresponds to the analog module 9.

In the case of the vibration prevention control, the camera lens MCU 1002 performs several kinds of control including the shift blur control and the angular blur control with respect to several axes including a yaw direction and a pitch direction. For example, to the shift blur, the output of a sensor detecting the velocity of a lens is converted by the A/D converter ADC, and the input data (velocity) is obtained. The input data (velocity) is stored in the RAM 5 for the necessary number (as the delay data), and is supplied to the FLT to perform a filter arithmetic. Then, the arithmetic result of FLT is supplied to the prescribed data register of the vibration prevention timer, etc. to realize the vibration prevention control (shift blur control).

In this case, the compare-match of the timer I, etc. is used so as to start the conversion of the prescribed A/D converter ADC. The DTC 3 is started by the conversion completion interrupt of the A/D converter ADC, and the input data (velocity) is supplied to the FLT with the coefficient data and the delay data. Furthermore, the DTC 3 performs data transfer of the filter arithmetic result to the prescribed data register of the timer.

The camera lens MCU 1002 can perform the control operation to the shift blur and angular blur in the yaw direction and the pitch direction, using one DTC and one FLT.

In the present case, it is possible to set the CPU 1 in the low power consumption state, such as a sleep or a standby mode. The vibration prevention operates in the many cases where the camera is in use, including framing; therefore, this can greatly contribute to the low power consumption of the camera system. Compared with the CPU, the DTC has a smaller logical scale and can perform high-speed processing. Therefore, it is possible to enhance the effect of the low power consumption. It is needless to say that the low power consumption is important in the camera system, etc. which is driven by a battery.

The present invention is not restricted to the embodiments described above, and it can be suitably changed in the range which does not deviate from the gist. For example, the data transfer information is defined in units of 32 bits; however, the data transfer information can be defined in units of arbitrary number of bits. It is also possible to change the arrangement of the data transfer information arbitrarily. Specifically, the number of bits of the address register is not restricted to 32 bits, but can be changed corresponding to the address space of a CPU or a microcomputer. For example, it is preferable to define the number of bits as 24 bits when the address space is 16 M bytes. It is also preferable to divide the bit arrangement of the MR and to combine it with a 24-bit SAR and DAR.

The program which is operated by the CPU may be arranged in an external memory in addition to the ROM. Similarly, the memory as the working area of the CPU is not restricted to a RAM but may be included in an external memory. The microcomputer may not be provided internally with either or both of a ROM and a RAM.

As for the data transfer information, the input data block, and the coefficient data block of the DTC, it is advantageous to store them in a RAM built in the microcomputer, in terms of the processing speed and the power consumption. However, they may be stored in an external memory.

Not restricted to the FIR filter or the IIR filter, the filter arithmetic unit can be applied to an arbitrary arithmetic unit which requires setting of plural pieces of data.

In the embodiments described above, the explanation has been made based on the system in which the data transfer information is stored in the storage device, such as a RAM. However, although the available data transfer information is restricted by the implemented hardware, it is possible to apply the data transfer explained in the embodiments described above also to the so-called DMA controller.

It is preferable to provide another data transfer controller such as a DMA controller, in addition to the DTC. It is possible to integrate the function of the DTC and the DMA controller to one functional module.

The detailed circuit configuration of the DTC and the interrupt controller can be changed to the various circuit configurations which have a function equivalent to the function explained in the embodiments described above. The detailed explanation of the BSC and the details of the bus operations such as bus and wait have been omitted; however, these can be implemented suitably. The configuration of the microcomputer has been illustrated only by an example, and it can be changed suitably.

In the embodiments described above, the explanation has been made about the microcomputer; however, the explanation has been made only for illustrative purposes. The DTC explained in the embodiments described above can be applied to various kinds of apparatuses, such as a data processing apparatus and a semiconductor integrated circuit having an arithmetic unit which is independent of the data processing apparatus.

As described above, the invention accomplished by the present inventors has been concretely explained based on the embodiments. However, it cannot be overemphasized that the present invention is not restricted to the embodiments as described above, and it can be changed variously in the range which does not deviate from the gist.

What is claimed is:
1. A semiconductor device comprising:
a data transfer controller operable to transfer plural pieces of data from a source address area to a destination address area continuously based on data transfer information, when a start request is received; and
an arithmetic unit operable to perform operation with the concurrent use of the plural pieces of data received from the data transfer controller,
wherein the data transfer controller selects a first transfer mode, based on the transfer mode specifying information included in the data transfer information,
wherein, in the first transfer mode, the data transfer controller reads the plural pieces of data from the source address area sequentially, and performs transfer operation to transfer the plural pieces of data read to the arithmetic unit in the order of the read,
wherein the plural pieces of data comprise:
plural pieces of input data used as an arithmetic target of the arithmetic unit; and
plural pieces of coefficient data employed in the operation of the arithmetic unit, and
wherein the arithmetic unit adds each of results of operation performed to the plural pieces of the input data using the coefficient data corresponding to the input data among the plural pieces of the coefficient data, and generates output data,
wherein the arithmetic unit performs a first arithmetic operation to generate one piece of output data, corresponding to a third transfer operation of the transfer operation,
wherein the arithmetic unit performs a second arithmetic operation to generate one piece of output data, corresponding to a fourth transfer operation of the transfer operation performed continuously after the third transfer operation, and
wherein the arithmetic unit employs the arithmetic result for the kth input data (k is a positive integer) obtained by the first arithmetic operation, as the (k−1)th input data of the second arithmetic operation.

2. The semiconductor device according to claim 1,
wherein the data transfer controller performs the transfer operation for the specified number of counts, based on the information which specifies the number of counts of the transfer operation and is included in the data transfer information.

3. The semiconductor device according to claim 2,
wherein the data transfer controller transfers plural pieces of first data in a first transfer operation of the transfer operation,
wherein the data transfer controller transfers plural pieces of second data in a second transfer operation of the transfer operation, following after the first transfer operation, and
wherein the second data is the same as the first data except that the oldest data read is removed and that new data is added as the youngest data read.

4. The semiconductor device according to claim 3,
wherein the plural pieces of the second data is changed in the order in which the oldest data read of the plural pieces of the first data is changed as the youngest data read.

5. The semiconductor device according to claim 1,
wherein the arithmetic unit multiplies each of the input data by the corresponding coefficient data among the plural pieces of the coefficient data.

6. The semiconductor device according to claim 1,
wherein the arithmetic unit performs a third arithmetic operation to generate one piece of output data, corresponding to a fifth transfer operation of the transfer operation,
wherein the arithmetic unit performs a fourth arithmetic operation to generate one piece of output data, corresponding to a sixth transfer operation of the transfer operation performed continuously after the fifth transfer operation, and wherein the arithmetic unit employs the arithmetic result for the jth output data (j is a positive integer) obtained by the third arithmetic operation, as the (j−1)th output data of the fourth arithmetic operation.

7. The semiconductor device according to claim 1,
wherein the data transfer controller performs data transfer of a plurality of transfer modes continuously.

8. The semiconductor device according to claim 1, further comprising:
a data input/output unit;
an interrupt control unit; and
a central processing unit,
wherein the data input/output unit makes an interrupt request to the interrupt control unit,
wherein the interrupt control unit issues a start request to the data transfer controller in response to the interrupt request,
wherein the interrupt control unit issues an interrupt request to the central processing unit, when the data transfer controller completes the data transfer, and
wherein the central processing unit sets up the data transfer information.

9. A semiconductor device comprising:
a data transfer controller operable to transfer plural pieces of data from a source address area to a destination address area continuously based on data transfer information, when a start request is received; and
an arithmetic unit operable to perform operation with the concurrent use of the plural pieces of data received from the data transfer controller,
wherein the data transfer controller selects a first transfer mode, based on the transfer mode specifying information included in the data transfer information,
wherein, in the first transfer mode, the data transfer controller reads the plural pieces of data from the source address area sequentially, and performs transfer operation to transfer the plural pieces of data read to the arithmetic unit in the order of the read,
wherein the plural pieces of data comprise:
plural pieces of input data used as an arithmetic target of the arithmetic unit; and
plural pieces of coefficient data employed in the operation of the arithmetic unit, and
wherein the arithmetic unit adds each of results of operation performed to the plural pieces of the input data using the coefficient data corresponding to the input data among the plural pieces of the coefficient data, and generates output data,
wherein the arithmetic unit stores the output data in a storage device,
wherein the data transfer controller reads one piece of or continuous plural pieces of the output data in the past, stored in the storage device,
wherein the data transfer controller transfers, to the arithmetic unit, the one piece of or the continuous plural pieces of the output data read, and
wherein the arithmetic unit adds respectively the result of the operation performed to the plural pieces of the input data using the plural pieces of the coefficient data, and the result of the operation performed to the one piece of or the continuous plural output data in the past using the one piece of or a continuous plural pieces of the coefficient data, and generates the output data.

10. The semiconductor device according to claim 9, further comprising:
a data input/output unit;
an interrupt control unit; and
a central processing unit,
wherein the data transfer controller performs data transfer of a plurality of transfer modes continuously,
wherein the data input/output unit makes an interrupt request to the interrupt control unit,
wherein the interrupt control unit issues a start request to the data transfer controller in response to the interrupt request,
wherein the interrupt control unit issues an interrupt request to the central processing unit, when the data transfer controller completes the data transfer, and
wherein the central processing unit sets up the data transfer information.

11. The semiconductor device according to claim 9,
wherein the data transfer controller performs the transfer operation for the specified number of counts, based on the information which specifies the number of counts of the transfer operation and is included in the data transfer information.

12. The semiconductor device according to claim 11,
wherein the data transfer controller transfers plural pieces of first data in a first transfer operation of the transfer operation,
wherein the data transfer controller transfers plural pieces of second data in a second transfer operation of the transfer operation, following after the first transfer operation, and
wherein the second data is the same as the first data except that the oldest data read is removed and that new data is added as the youngest data read.

13. The semiconductor device according to claim 12,
wherein the plural pieces of the second data is changed in the order in which the oldest data read of the plural pieces of the first data is changed as the youngest data read.

14. The semiconductor device according to claim 9,
wherein the arithmetic unit multiplies each of the input data by the corresponding coefficient data among the plural pieces of the coefficient data.

* * * * *